United States Patent
Sampson et al.

(10) Patent No.: US 9,450,665 B2
(45) Date of Patent: Sep. 20, 2016

(54) DIVERSITY RECEIVER FOR WIRELESS COMMUNICATION

(75) Inventors: Wesley Alan Sampson, La Jolla, CA (US); Aristotele Hadjichristos, Cary, NC (US); Gurkanwal S Sahota, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1101 days.

(21) Appl. No.: 11/548,596

(22) Filed: Oct. 11, 2006

(65) Prior Publication Data

US 2007/0242784 A1    Oct. 18, 2007

Related U.S. Application Data

(60) Provisional application No. 60/728,079, filed on Oct. 19, 2005.

(51) Int. Cl.
*H04B 7/10* (2006.01)
*H04B 7/08* (2006.01)
*H04W 88/06* (2009.01)

(52) U.S. Cl.
CPC .......... *H04B 7/0822* (2013.01); *H04W 88/06* (2013.01); *H04B 7/0825* (2013.01); *H04B 7/0831* (2013.01)

(58) Field of Classification Search
CPC  H04B 7/0822; H04B 7/0831; H04B 7/0845; H04B 7/0854; H04B 7/0857; H04L 1/06; H04L 27/2647
USPC ....... 375/347, 346, 316, 377, 343, 350, 349, 375/229, 230, 232; 455/324, 345
See application file for complete search history.

(56) References Cited

U.S. PATENT DOCUMENTS

| | | |
|---|---|---|
| 3,911,364 A | 10/1975 | Langseth et al. |
| 4,035,728 A | 7/1977 | Ishikawa et al. |
| 4,035,729 A | 7/1977 | Perry |

(Continued)

FOREIGN PATENT DOCUMENTS

| | | |
|---|---|---|
| CN | 1523912 A | 8/2004 |
| CN | 1922795 A | 2/2007 |

(Continued)

OTHER PUBLICATIONS

International Search Authority, PCT/US2006/060082, Jul. 2, 2007.

(Continued)

*Primary Examiner* — Zewdu Kassa
(74) *Attorney, Agent, or Firm* — Liberty E. Mann

(57) ABSTRACT

A diversity receiver capable of receiving a CDMA system (e.g., a W-CDMA system) and a TDMA system (e.g., a GSM system), with receive diversity for at least one system, is described. W-CDMA is often referred to as UMTS. In one design, the diversity receiver includes a first receiver for GSM and a second receiver for UMTS. The first receiver may be implemented with one receiver design, may be spec-compliant for GSM, and may also support UMTS. The second receiver may be implemented with another receiver design, may be spec-compliant for UMTS, and may also support GSM. The first receiver may include a lowpass filter having a bandwidth that is adjustable for GSM and UMTS. The second receiver may include a bandpass filter used to attenuate a transmit frequency range for UMTS. Each receiver may include circuit blocks that are used for both GSM and UMTS.

35 Claims, 10 Drawing Sheets

(56) References Cited

U.S. PATENT DOCUMENTS

| | | |
|---|---|---|
| 4,246,655 A | 1/1981 | Parker |
| 4,326,294 A | 4/1982 | Okamoto et al. |
| 4,715,048 A | 12/1987 | Masamura |
| 4,742,563 A | 5/1988 | Fukumura |
| 4,756,023 A | 7/1988 | Kojima |
| 4,969,207 A | 11/1990 | Sakamoto et al. |
| 5,056,411 A | 10/1991 | Baker |
| 5,128,630 A | 7/1992 | Mijuskovic |
| 5,291,519 A | 3/1994 | Tsurumaru |
| 5,321,850 A | 6/1994 | Backstrom et al. |
| 5,345,601 A | 9/1994 | Takagi et al. |
| 5,390,342 A | 2/1995 | Takayama et al. |
| 5,559,838 A | 9/1996 | Nakagoshi |
| 5,566,364 A | 10/1996 | Mizoguchi et al. |
| 5,694,396 A | 12/1997 | Firouzbakht et al. |
| 5,697,083 A | 12/1997 | Sano |
| 5,761,613 A | 6/1998 | Saunders et al. |
| 5,794,159 A | 8/1998 | Portin |
| 5,805,643 A | 9/1998 | Seki et al. |
| 5,805,989 A | 9/1998 | Ushida |
| 5,835,853 A | 11/1998 | Enoki et al. |
| 5,940,452 A | 8/1999 | Rich |
| 5,999,815 A | 12/1999 | TenBrook et al. |
| 5,999,990 A | 12/1999 | Sharrit et al. |
| 6,026,288 A | 2/2000 | Bronner |
| 6,040,732 A | 3/2000 | Brokaw |
| 6,044,254 A | 3/2000 | Ohta et al. |
| 6,063,961 A | 5/2000 | Kroner |
| 6,069,923 A | 5/2000 | Ostman et al. |
| 6,088,348 A | 7/2000 | Bell, III et al. |
| 6,208,844 B1 * | 3/2001 | Abdelgany ............... 455/82 |
| 6,249,687 B1 | 6/2001 | Thomsen et al. |
| 6,407,689 B1 | 6/2002 | Bazarjani et al. |
| 6,424,683 B1 | 7/2002 | Schollhorn |
| 6,430,237 B1 | 8/2002 | Anvari |
| 6,472,947 B1 | 10/2002 | Zeitz |
| 6,473,601 B1 | 10/2002 | Oda |
| 6,522,895 B1 | 2/2003 | Montalvo |
| 6,535,725 B2 | 3/2003 | Hatcher et al. |
| 6,600,759 B1 | 7/2003 | Wood |
| 6,600,907 B1 | 7/2003 | Taguchi |
| 6,600,931 B2 * | 7/2003 | Sutton et al. ............ 455/552.1 |
| 6,657,498 B2 | 12/2003 | Park et al. |
| 6,806,777 B2 | 10/2004 | Franca-Neto |
| 6,819,941 B2 | 11/2004 | Dening et al. |
| 6,888,888 B1 | 5/2005 | Tu et al. |
| 6,952,594 B2 | 10/2005 | Hendin |
| 6,954,446 B2 | 10/2005 | Kuffner |
| 6,983,132 B2 | 1/2006 | Woo et al. |
| 6,985,712 B2 * | 1/2006 | Yamakawa et al. ......... 455/333 |
| 6,987,950 B2 | 1/2006 | Coan |
| 7,013,166 B2 | 3/2006 | Clifford |
| 7,024,172 B1 | 4/2006 | Murphy et al. |
| 7,039,377 B2 | 5/2006 | Yates |
| 7,123,891 B2 | 10/2006 | Loke |
| 7,142,042 B1 | 11/2006 | Henry |
| 7,161,423 B2 | 1/2007 | Paul et al. |
| 7,167,044 B2 | 1/2007 | Li et al. |
| 7,187,239 B2 | 3/2007 | Yeh |
| 7,187,735 B2 | 3/2007 | Kent, III et al. |
| 7,187,904 B2 | 3/2007 | Gainey et al. |
| 7,212,788 B2 | 5/2007 | Weber et al. |
| 7,224,231 B2 | 5/2007 | Wu |
| 7,260,377 B2 | 8/2007 | Burns et al. |
| 7,283,851 B2 | 10/2007 | Persico et al. |
| 7,299,021 B2 | 11/2007 | Pärssinen et al. |
| 7,313,368 B2 | 12/2007 | Wu et al. |
| 7,317,894 B2 | 1/2008 | Hirose |
| 7,333,831 B2 | 2/2008 | Srinivasan et al. |
| 7,356,325 B2 | 4/2008 | Behzad et al. |
| 7,403,508 B1 | 7/2008 | Miao |
| 7,444,166 B2 | 10/2008 | Sahota |
| 7,454,181 B2 | 11/2008 | Banister et al. |
| 7,477,106 B2 * | 1/2009 | Van Bezooijen et al. .... 330/296 |
| 7,570,111 B1 | 8/2009 | Vagher et al. |
| 7,599,675 B2 | 10/2009 | Mu et al. |
| 7,643,847 B2 | 1/2010 | Daanen et al. |
| 7,697,905 B2 | 4/2010 | Lee et al. |
| 7,728,664 B2 | 6/2010 | Chang et al. |
| 7,751,513 B2 | 7/2010 | Eisenhut et al. |
| 7,764,726 B2 | 7/2010 | Simic et al. |
| 7,848,724 B2 | 12/2010 | Bult et al. |
| 7,869,528 B2 | 1/2011 | Robinson |
| 7,877,075 B1 | 1/2011 | Jin et al. |
| 7,911,269 B2 | 3/2011 | Yang et al. |
| 7,944,298 B2 | 5/2011 | Cabanillas et al. |
| 7,949,309 B2 | 5/2011 | Rofougaran et al. |
| 7,952,398 B2 | 5/2011 | Salcido et al. |
| 8,022,772 B2 | 9/2011 | Cassia et al. |
| 8,055,229 B2 | 11/2011 | Huang |
| 8,063,706 B2 | 11/2011 | Li et al. |
| 8,081,672 B2 | 12/2011 | Kent et al. |
| 8,090,332 B2 | 1/2012 | Sahota et al. |
| 8,090,369 B2 | 1/2012 | Kitazoe |
| 8,139,670 B1 | 3/2012 | Son et al. |
| 8,149,955 B2 | 4/2012 | Tired |
| 8,195,117 B2 | 6/2012 | Bult et al. |
| 8,208,887 B2 | 6/2012 | Lee et al. |
| 8,217,723 B2 | 7/2012 | Rajendran et al. |
| 8,242,841 B2 | 8/2012 | Zhang |
| 8,270,927 B2 | 9/2012 | Wallace et al. |
| 8,290,449 B2 | 10/2012 | Keehr et al. |
| 8,295,778 B2 | 10/2012 | Kotecha et al. |
| 8,306,494 B2 | 11/2012 | Ojo |
| 8,442,473 B1 | 5/2013 | Kaukovuori et al. |
| 8,514,015 B2 | 8/2013 | Chen |
| 8,600,315 B2 | 12/2013 | Roufoogaran et al. |
| 8,626,084 B2 | 1/2014 | Chan et al. |
| 8,676,148 B2 | 3/2014 | Ogasawara |
| 8,706,069 B2 | 4/2014 | Khoini-Poorfard et al. |
| 2002/0008575 A1 | 1/2002 | Oskowsky et al. |
| 2002/0061773 A1 | 5/2002 | Adachi et al. |
| 2002/0111163 A1 | 8/2002 | Hamabe |
| 2002/0132597 A1 | 9/2002 | Peterzell et al. |
| 2002/0173337 A1 | 11/2002 | Hajimiri et al. |
| 2002/0193108 A1 | 12/2002 | Robinett |
| 2003/0060176 A1 * | 3/2003 | Heinonen ............ H03B 5/1203 |
| | | 455/255 |
| 2003/0076797 A1 | 4/2003 | Lozano |
| 2003/0081694 A1 | 5/2003 | Wieck |
| 2003/0125040 A1 | 7/2003 | Walton et al. |
| 2003/0148750 A1 | 8/2003 | Yan et al. |
| 2003/0157915 A1 * | 8/2003 | Atkinson et al. ............ 455/306 |
| 2003/0176176 A1 * | 9/2003 | Leinonen et al. ......... 455/277.1 |
| 2003/0203743 A1 | 10/2003 | Sugar et al. |
| 2003/0206076 A1 | 11/2003 | Hashemi et al. |
| 2003/0228851 A1 | 12/2003 | Taniguchi |
| 2004/0087290 A1 | 5/2004 | Schmidt et al. |
| 2004/0092243 A1 | 5/2004 | Hey-Shipton |
| 2004/0113746 A1 | 6/2004 | Brindle |
| 2004/0116086 A1 | 6/2004 | Huttunen |
| 2004/0121753 A1 | 6/2004 | Sugar et al. |
| 2004/0204104 A1 | 10/2004 | Horng et al. |
| 2004/0219959 A1 | 11/2004 | Khayrallah et al. |
| 2004/0224643 A1 * | 11/2004 | Nakai ............................. 455/78 |
| 2004/0253955 A1 | 12/2004 | Love et al. |
| 2004/0266356 A1 | 12/2004 | Javor et al. |
| 2005/0039060 A1 | 2/2005 | Okayasu |
| 2005/0075077 A1 | 4/2005 | Mach et al. |
| 2005/0079847 A1 | 4/2005 | Arafa |
| 2005/0118977 A1 | 6/2005 | Drogi et al. |
| 2005/0197090 A1 | 9/2005 | Stockstad et al. |
| 2005/0215204 A1 | 9/2005 | Wallace et al. |
| 2005/0215264 A1 | 9/2005 | Subramaniam et al. |
| 2005/0227631 A1 | 10/2005 | Robinett |
| 2005/0231290 A1 | 10/2005 | Hung et al. |
| 2005/0265084 A1 | 12/2005 | Choi |
| 2005/0277387 A1 | 12/2005 | Kojima et al. |
| 2006/0009177 A1 | 1/2006 | Persico et al. |
| 2006/0023745 A1 | 2/2006 | Koo et al. |
| 2006/0061773 A1 | 3/2006 | Lee et al. |
| 2006/0121937 A1 | 6/2006 | Son |
| 2006/0128322 A1 | 6/2006 | Igarashi et al. |
| 2006/0146693 A1 | 7/2006 | Mori et al. |

(56) References Cited

U.S. PATENT DOCUMENTS

| | | |
|---|---|---|
| 2006/0170503 A1 | 8/2006 | Lee et al. |
| 2006/0189286 A1 | 8/2006 | Kyu et al. |
| 2006/0222100 A1 | 10/2006 | Behzad |
| 2006/0234662 A1* | 10/2006 | Diloisy .......................... 455/273 |
| 2006/0291428 A1 | 12/2006 | Filipovic |
| 2007/0049332 A1 | 3/2007 | Higuchi |
| 2007/0060080 A1 | 3/2007 | Nishimura et al. |
| 2007/0072577 A1 | 3/2007 | Rozenblit et al. |
| 2007/0105517 A1 | 5/2007 | Chang et al. |
| 2007/0142013 A1 | 6/2007 | Bucknor et al. |
| 2007/0177656 A1 | 8/2007 | Maruta et al. |
| 2007/0177693 A1 | 8/2007 | Kluge |
| 2007/0184801 A1 | 8/2007 | Kogawa et al. |
| 2007/0197170 A1 | 8/2007 | Boos |
| 2007/0197178 A1 | 8/2007 | Gu |
| 2007/0197204 A1* | 8/2007 | Herczog et al. ............ 455/422.1 |
| 2007/0202890 A1* | 8/2007 | Feher ...................... H04M 11/04 455/456.1 |
| 2007/0243832 A1* | 10/2007 | Park ...................... H04B 1/006 455/73 |
| 2007/0262817 A1 | 11/2007 | Ciccarelli et al. |
| 2007/0262871 A1 | 11/2007 | Yamagajo et al. |
| 2008/0004078 A1 | 1/2008 | Barratt et al. |
| 2008/0013654 A1 | 1/2008 | Rick et al. |
| 2008/0116976 A1 | 5/2008 | Chang et al. |
| 2008/0117999 A1 | 5/2008 | Kadous et al. |
| 2008/0139151 A1 | 6/2008 | Ojo et al. |
| 2008/0204148 A1 | 8/2008 | Kim et al. |
| 2008/0224770 A1 | 9/2008 | Kim et al. |
| 2008/0224791 A1 | 9/2008 | Cheng |
| 2008/0225971 A1 | 9/2008 | Behzad |
| 2008/0261650 A1 | 10/2008 | Piriyapoksombut et al. |
| 2008/0297259 A1 | 12/2008 | Mu |
| 2009/0124227 A1 | 5/2009 | Ishiguro |
| 2009/0227214 A1 | 9/2009 | Georgantas et al. |
| 2009/0237161 A1 | 9/2009 | Fagg |
| 2009/0243869 A1 | 10/2009 | Sanderford, Jr. |
| 2009/0253456 A1 | 10/2009 | Toh et al. |
| 2009/0290659 A1 | 11/2009 | Petrovic et al. |
| 2009/0323779 A1 | 12/2009 | Lennen |
| 2010/0019970 A1 | 1/2010 | Farrokhi et al. |
| 2010/0034094 A1 | 2/2010 | Tenny |
| 2010/0040178 A1 | 2/2010 | Sutton et al. |
| 2010/0041359 A1 | 2/2010 | Liu et al. |
| 2010/0142440 A1 | 6/2010 | Inoue |
| 2010/0195754 A1 | 8/2010 | Li et al. |
| 2010/0197263 A1 | 8/2010 | Dwyer et al. |
| 2010/0210226 A1 | 8/2010 | Matsuyama |
| 2010/0210272 A1 | 8/2010 | Sundstrom et al. |
| 2010/0210299 A1 | 8/2010 | Gorbachov |
| 2010/0214184 A1 | 8/2010 | Tran et al. |
| 2010/0225414 A1 | 9/2010 | Gorbachov |
| 2010/0226327 A1 | 9/2010 | Zhang et al. |
| 2010/0232493 A1 | 9/2010 | Thirumoorthy |
| 2010/0237947 A1 | 9/2010 | Xiong et al. |
| 2010/0253435 A1 | 10/2010 | Ichitsubo et al. |
| 2010/0265875 A1 | 10/2010 | Zhao et al. |
| 2010/0271986 A1 | 10/2010 | Chen |
| 2010/0272051 A1 | 10/2010 | Fu et al. |
| 2010/0301946 A1 | 12/2010 | Borremans |
| 2010/0311378 A1 | 12/2010 | Tasic et al. |
| 2010/0328155 A1 | 12/2010 | Simic et al. |
| 2010/0330977 A1 | 12/2010 | Kadous et al. |
| 2011/0018635 A1 | 1/2011 | Tasic et al. |
| 2011/0044380 A1 | 2/2011 | Marra et al. |
| 2011/0050319 A1 | 3/2011 | Wong |
| 2011/0084791 A1 | 4/2011 | Mun et al. |
| 2011/0086603 A1 | 4/2011 | Toosi et al. |
| 2011/0110463 A1 | 5/2011 | Chang et al. |
| 2011/0122972 A1 | 5/2011 | Lie et al. |
| 2011/0165848 A1 | 7/2011 | Gorbachov et al. |
| 2011/0193625 A1 | 8/2011 | Gatta et al. |
| 2011/0194504 A1 | 8/2011 | Gorokhov et al. |
| 2011/0204973 A1 | 8/2011 | Hu et al. |
| 2011/0211533 A1 | 9/2011 | Casaccia et al. |
| 2011/0217945 A1 | 9/2011 | Uehara et al. |
| 2011/0222443 A1 | 9/2011 | Khlat |
| 2011/0222444 A1 | 9/2011 | Khlat et al. |
| 2011/0242999 A1 | 10/2011 | Palanki et al. |
| 2011/0250926 A1 | 10/2011 | Wietfeldt et al. |
| 2011/0268048 A1 | 11/2011 | Toskala et al. |
| 2011/0268232 A1 | 11/2011 | Park et al. |
| 2011/0292844 A1 | 12/2011 | Kwun et al. |
| 2011/0299434 A1 | 12/2011 | Gudem et al. |
| 2011/0300810 A1 | 12/2011 | Mikhemar et al. |
| 2012/0009886 A1 | 1/2012 | Poulin |
| 2012/0013387 A1 | 1/2012 | Sankaranarayanan et al. |
| 2012/0026862 A1 | 2/2012 | Sadri et al. |
| 2012/0044927 A1 | 2/2012 | Pan et al. |
| 2012/0056681 A1 | 3/2012 | Lee |
| 2012/0057621 A1 | 3/2012 | Hong et al. |
| 2012/0195237 A1 | 8/2012 | Chan et al. |
| 2012/0236829 A1 | 9/2012 | Takano et al. |
| 2012/0293265 A1 | 11/2012 | Heikkinen et al. |
| 2012/0294299 A1 | 11/2012 | Fernando |
| 2012/0327825 A1 | 12/2012 | Gudem et al. |
| 2012/0329395 A1 | 12/2012 | Husted et al. |
| 2013/0003617 A1 | 1/2013 | Gudem et al. |
| 2013/0003783 A1 | 1/2013 | Gudem et al. |
| 2013/0043946 A1 | 2/2013 | Hadjichristos et al. |
| 2013/0051284 A1 | 2/2013 | Khlat |
| 2013/0114769 A1 | 5/2013 | Fernando |
| 2013/0163492 A1 | 6/2013 | Wong |
| 2013/0217398 A1 | 8/2013 | Winiecki et al. |
| 2013/0230080 A1 | 9/2013 | Gudem et al. |
| 2013/0231064 A1 | 9/2013 | Gudem et al. |
| 2013/0265892 A1 | 10/2013 | Fernando |
| 2013/0315348 A1 | 11/2013 | Tasic et al. |
| 2013/0316668 A1 | 11/2013 | Davierwalla et al. |
| 2013/0316669 A1 | 11/2013 | Davierwalla et al. |
| 2013/0316670 A1 | 11/2013 | Tasic et al. |
| 2013/0329665 A1 | 12/2013 | Kadous et al. |
| 2014/0072001 A1 | 3/2014 | Chang et al. |
| 2014/0113578 A1 | 4/2014 | Xu |
| 2014/0269853 A1 | 9/2014 | Gudem et al. |

FOREIGN PATENT DOCUMENTS

| | | |
|---|---|---|
| CN | 101228702 A | 7/2008 |
| CN | 101242158 A | 8/2008 |
| CN | 101523967 A | 9/2009 |
| CN | 101789805 A | 7/2010 |
| EP | 1164719 | 12/2001 |
| EP | 1370012 | 12/2003 |
| EP | 1398887 | 3/2004 |
| EP | 1708372 A2 | 10/2006 |
| EP | 1726098 A1 | 11/2006 |
| EP | 1748567 A2 | 1/2007 |
| EP | 1761076 A2 | 3/2007 |
| EP | 2068583 A1 | 6/2009 |
| EP | 2141818 A1 | 1/2010 |
| EP | 1916767 B1 | 12/2010 |
| EP | 2393205 A2 | 12/2011 |
| EP | 2398285 A1 | 12/2011 |
| GB | 2472978 A | 3/2011 |
| JP | 05227234 | 9/1993 |
| JP | H0730452 A | 1/1995 |
| JP | 07221684 | 8/1995 |
| JP | 9027778 A | 1/1997 |
| JP | 09116458 | 5/1997 |
| JP | H11127300 A | 5/1999 |
| JP | 2000013278 A | 1/2000 |
| JP | 2001285114 | 10/2001 |
| JP | 2002261880 A | 9/2002 |
| JP | 2004015162 A | 1/2004 |
| JP | 2006520143 A | 8/2006 |
| JP | 2007324711 A | 12/2007 |
| JP | 2008085793 A | 4/2008 |
| JP | 2008519535 A | 6/2008 |
| JP | 2009027778 | 2/2009 |
| JP | 2009130867 A | 6/2009 |
| JP | 2011015112 A | 1/2011 |
| JP | 2011082669 A | 4/2011 |
| JP | 2011091747 A | 5/2011 |

(56) References Cited

FOREIGN PATENT DOCUMENTS

| | | |
|---|---|---|
| JP | 2011119807 A | 6/2011 |
| WO | WO01050636 | 7/2001 |
| WO | 0237686 | 5/2002 |
| WO | WO2005039060 | 4/2005 |
| WO | 2005062477 A2 | 7/2005 |
| WO | WO2005064816 | 7/2005 |
| WO | 2005088847 A1 | 9/2005 |
| WO | WO2005104389 A1 | 11/2005 |
| WO | 2006050515 A2 | 5/2006 |
| WO | 2006118538 A2 | 11/2006 |
| WO | 2008059257 A1 | 5/2008 |
| WO | 2008084539 A1 | 7/2008 |
| WO | 2008103757 | 8/2008 |
| WO | WO2008092745 A1 | 8/2008 |
| WO | 2008145604 A1 | 12/2008 |
| WO | 2010059257 A1 | 5/2010 |
| WO | 2011019850 A1 | 2/2011 |
| WO | WO2011050729 A1 | 5/2011 |
| WO | WO2011092005 A1 | 8/2011 |
| WO | 2011138697 A1 | 11/2011 |
| WO | 2012008705 A2 | 1/2012 |
| WO | 2012049529 A1 | 4/2012 |
| WO | 2013036794 A1 | 3/2013 |
| WO | 2013131047 | 9/2013 |

OTHER PUBLICATIONS

Written Opinion—PCT/US2006/060082, International Search Authority, European Patent Office, Feb. 7, 2007.
Aparin et al., "A Highly-integrated tri-band/quad-mode SiGe BiCMOS RF-to-baseband and receiver for wireless CDMA/WCDMA/AMPS applications with GPS capability", Solid-State Circuits Conference, 2002. Digest of Technical Papers. 2002 IEEE International Feb. 3-7, 2002, Piscataway, NJ, USA, IEEE, vol. 1, 2002, pp. 234-235, XP010585547, ISBN: 0-7803-7335-9.
Hwang, et al., "A High IIP2 Direct-Conversion Receiver using Even-Harmonic Reduction Technique for Cellular CDMA/PCS/GPS applications," IEEE Transaction on Circuits and Systems.
MSM6000 Chipset Solution, Qualcomm Incorporated.
MSM6500 Chipset Solution, Qualcomm Incorporated.
Sever et al. "A Dual-Antenna Phase-Array Ultra-Wideband CMOS Transceiver". IEEE Communications Magazine [Online] 2006, vol. 44, Issue 8, pp. 102-110. See pp. 104-107.
Winternitz, et al., "A GPS Receiver for High-Altitude Satellite Navigation," IEEE Journal of Selected Topics in Signal Processing, vol. 3, No. 4, pp. 541-556, Aug. 2009.
3GPP TS 36.101 V11.0.0, 3rd Generation Partnership Project; Technical Specification Group Radio Access Network; Evolved Universal Terrestrial Radio Access (E-UTRA); User Equipment (UE) radio transmission and reception (Release 11), Mar. 2012.
Broyde, et al., "The Noise Performance of aMultiple-Input-Port and Multiple-Output-Port Low-Noise Amplifier Connected to an Array of Coupled Antennas," International Journal of Antennas and Propagation, vol. 2011, Article ID 438478, Jul. 18, 2011, 12 pages.
Chen, et al, "A 5-6 GHz 1-V CMOS Direct-Conversion Receiver With an Integrated Quadrature Coupler," IEEE Journal of Solid-State Circuits, vol. 42, No. 9, 2007, pp. 1963-1975.
Chen, et al., "A monolithic 5.9-GHz CMOS I/Q direct-down converter utilizing a quadrature coupler and transformer-coupled subharmonic mixers," Microwave and Wireless Components Letters, IEEE, vol. 16, No. 4, 2006, pp. 197-199.

Garuda, et al., "A Multi-band CMOS RF Front-end for 4G WiMAX and WLAN Applications," 2006 IEEE International Symposium on Circuits and Systes, 2006. ISCAS 2006. May 2006, 4 pages.
Hashemi, et al., "Concurrent Multiband Low-Noise Amplifiers—Theory, Design, and Applications," IEEE Transactions on Microwave Theory and Techniques, vol. 50, No. 1, Jan. 2002.
Henrik M et al., "A Full Duplex Front End Module for WiFi 802.11.n Applications", European Microwave Association, vol. 12, No. 4, Oct. 2008, pp. 162-165.
Jussi R et al., "A Dual-Band RF Front-End for WCDMA and GSM Applications", IEEE, Journal Solid-State Circuits, 2001, vol. 36, No. 8, pp. 1198-1204.
Kevin W et al., "3G/4G Multimode Cellular Front End Challenges", Part 2: Architecture Discussion, RFMD® White Paper, 9 pages.
Kim, T.W., et al., Highly Linear Receiver Front-End Adopting MOSFET Transconductance Linearization by Multiple Gated Transistors, IEEE Journal of Solid-State Circuits, United States, IEEE, Jan. 1, 2004, vol. 39, No. 1, pp. 223-229.
Lee et al., "Development of Miniature Quad SAW filter bank based on PCB substrate", IEEE Intl Frequency Control Symp, pp. 146-149, 2007.
Pitschi M. et al., "High Performance Microwave Acoustic Components for Mobile Radios", Ultrasonics Symposium (IUS), 2009 IEEE International, EPCOS AG, Munich, Germany, vol. 1, Sep. 20-23, 2009.
Rahn D.G., et al., "A fully integrated multiband MIMO WLAN transceiver RFIC," IEEE J. Solid-State Circuits, 2005, vol. 40 (8), 1629-1641.
Tasic A. et al., "Design of Adaptive Multimode RF Front-End Circuits", IEEE Journal of Solid-State Circuits, vol. 42, Issue 2, Feb. 2007 pp. 313-322.
"UMTS Picocell Front End Module", CTS Corp. 8 pages.
European Search Report—EP10007688—Search Authority—Munich—Oct. 11, 2012.
European Search Report—EP10007689—Search Authority—Munich—Oct. 17, 2012.
International Search Report and Written Opinion—PCT/US2012/064513—ISA/EPO—Feb. 5, 2013.
Jones W. W., et al., "Narrowband interference suppression using filter-bank analysis/synthesis techniques", Military Communications Conference, 1992. MILC0M '92, Conference RECD0R D. Communications—Fusing Command, Control and Intelligence., IEEE San Diego, CA, USA, 11 14 Oct. 1992, New York, NY, USA, IEEE, US, Oct. 11, 1992, pp. 898-902, XP010060840, DOI: 10.1109/MILCOM.1992.243977, ISBN: 978-0-7803-0585-4.
QUALCOMM Europe: "UE Implementation Impact due to 4C-HSDPA Operation", 3GPP Draft; R1-094067_UE_IMPL_Impact_4C_HSDPA, 3rd Generation Partnership Project (3GPP), Mobile Competence Centre; 650, Route Des Lucioles ; F-06921 Sophia-Antipolis Cedex ; France, No. Miyazaki; Oct. 12, 2009, XP050388547, [retrieved on Oct. 16, 2009].
Lai, C.M.,et al., "Compact router transceiver architecture for carrier aggregation systems", Microwave Conference (EUMC), 2011 41st European, IEEE, Oct. 10, 2011, pp. 693-696, XP032072825, ISBN: 978-1-61284-235-6 the whole document.
Philips: "Capabilities of multi-transceiver UES", 3GPP Draft; R1-103913, 3rd Generation Partnership Project (3GPP), Mobile Competence Centre; 650, Route Des Lucioles; F-06921 Sophia-Antipolis Cedex; France, vol. RAN WG1, No. Dresden, Germany; Jun. 28, 2010, Jun. 22, 2010, XP050449298, [retrieved on Jun. 22, 2010] the whole document.

\* cited by examiner

DIVERSITY RECEIVER FOR WIRELESS COMMUNICATION

RELATED APPLICATION

This application claims the benefit of provisional U.S. Application Ser. No. 60/728,079, entitled "A COMBINED ARCHITECTURE FOR UMTS AND GSM/EDGE DRIVERS RECEPTION," filed Oct. 19, 2005, assigned to the assignee of the present application, and incorporated herein by reference in its entirety for all purposes.

BACKGROUND

1. Field

The present disclosure relates generally to electronics, and more specifically to a diversity receiver for wireless communication.

2. Background

In a wireless communication system, a transmitter modulates data onto a radio frequency (RF) carrier signal to generate an RF modulated signal that is more suitable for transmission. The transmitter then transmits the RF modulated signal via a wireless channel to a receiver. The transmitted signal may reach the receiver via one or more propagation paths, e.g., line-of-sight and/or reflected paths. The characteristics of the propagation paths may vary over time due to various phenomena such as fading and multipath. Consequently, the transmitted signal may experience different channel conditions and may be received with different amplitudes and/or phases over time.

The receiver processes the received RF signal and attempts to recover the data sent by the transmitter. The performance of the receiver is dependent on the received signal quality, which may fluctuate widely due to fading and multipath. Hence, performance may suffer whenever the receiver experiences deleterious path effects. This degradation in performance is undesirable.

There is therefore a need in the art for a receiver that can achieve good performance in the presence of deleterious path effects.

SUMMARY

A diversity receiver capable of receiving a Code Division Multiple Access (CDMA) system and a Time Division Multiple Access (TDMA) system, with receive diversity for at least one system, is described herein. Receive diversity refers to reception of a transmission with multiple antennas to provide diversity against deleterious path effects. The TDMA system may be a Global System for Mobile Communications (GSM) system or some other TDMA system. The CDMA system may be a Wideband-CDMA (W-CDMA) system, a cdma2000 system, or some other CDMA system. W-CDMA is used in and is also often referred to as Universal Mobile Telecommunications System (UMTS).

In an embodiment, the diversity receiver includes a first receiver for GSM and a second receiver for UMTS. The first receiver may be implemented with a first receiver design, may be spec-compliant for GSM, and may also support UMTS. The second receiver may be implemented with a second receiver design, may be spec-compliant for UMTS, and may also support GSM. The first receiver may include a lowpass filter having an adjustable bandwidth that may be set for either GSM or UMTS. The second receiver may include a bandpass filter used to attenuate a transmit frequency range for UMTS. Each receiver may include circuit blocks that are used for both GSM and UMTS, which may reduce complexity, cost and circuit area.

In an embodiment, a switch and filter unit couples the first receiver to a primary antenna when receiving GSM and couples the second receiver to the primary antenna when receiving UMTS. If the first receiver also supports UMTS, then the switch and filter unit couples the first receiver to a diversity antenna when receiving UMTS. If the second receiver also supports GSM, then the switch and filter unit couples the second receiver to the diversity antenna when receiving GSM. The switch and filter unit may also perform filtering for GSM and UMTS.

Various aspects and embodiments of the invention are described in further detail below.

DETAILED DESCRIPTION

The diversity receiver described herein may be used for various wireless communication systems such as CDMA systems, TDMA systems, Frequency Division Multiple Access (FDMA) systems, Orthogonal FDMA (OFDMA) systems, and so on. A CDMA system may implement a radio technology such as W-CDMA, cdma2000, and so on. cdma2000 covers IS-2000, IS-856, and IS-95 standards. IS-2000 and IS-95 are often referred to as CDMA2000 1x, or simply "1x". A TDMA system may implement a radio technology such as GSM, Digital Advanced Mobile Phone System (D-AMPS), and so on. D-AMPS covers IS-136 and IS-54. These various radio technologies and standards are known in the art. W-CDMA and GSM are described in documents from a consortium named "3rd Generation Partnership Project" (3GPP). cdma2000 is described in documents from a consortium named "3rd Generation Partnership Project 2" (3GPP2). 3GPP and 3GPP2 documents are publicly available.

In general, the diversity receiver described herein may support any number of radio technologies and any ones of the radio technologies known in the art. For clarity, the diversity receiver is specifically described below for GSM and UMTS.

Figure 1:
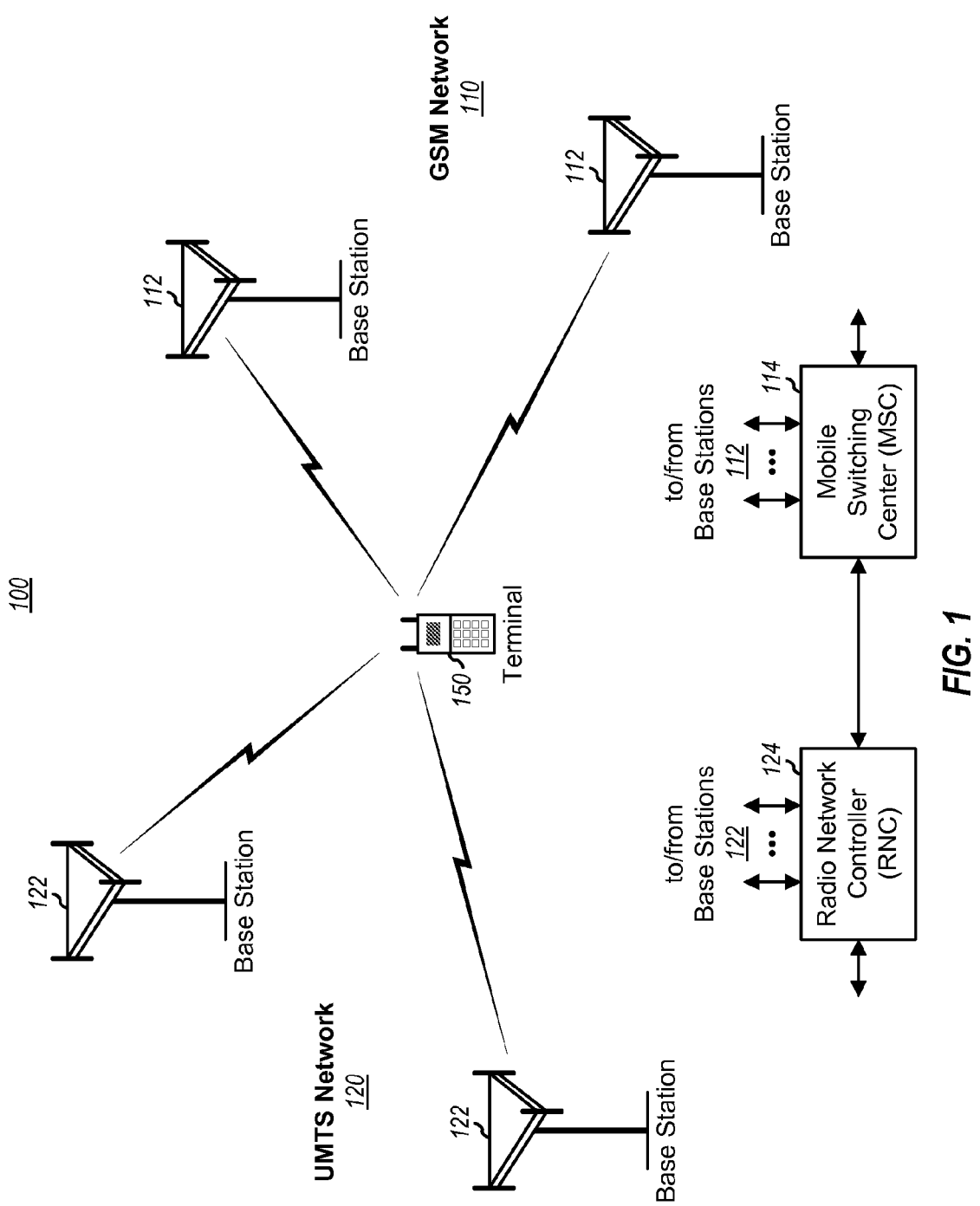
FIG. 1 shows a PLMN that includes a GSM network and a UMTS network.

FIG. 1 shows a public land mobile network (PLMN) 100 that includes a GSM network 110 and a UMTS network 120. The terms "network" and "system" are often used interchangeably. UMTS network 120 implements W-CDMA and is also called a UMTS Terrestrial Radio Access Network (UTRAN). The term "UMTS" and "W-CDMA" are used interchangeably in the description below. GSM network 110 and UMTS network 120 are two wireless networks employing different radio technologies (GSM and W-CDMA) but belonging to the same service provider or network operator.

GSM network 110 includes base stations 112 that communicate with terminals within the coverage area of the GSM network. A base station is a fixed station that communicates with the terminals and may also be called a Node B, a base transceiver station (BTS), an access point, and so on. A mobile switching center (MSC) 114 couples to base stations 112 and provides coordination and control for these base stations. UMTS network 120 includes base stations 122 that communicate with terminals within the coverage area of the UMTS network. A radio network controller (RNC) 124 couples to base stations 122 and provides coordination and control for these base stations. RNC 124 communicates with MSC 114 to support inter-working between the GSM and UMTS networks.

A terminal 150 is capable of communicating with GSM network 110 and UMTS network 120, typically with one wireless network at any given moment. This capability allows a user to obtain the performance advantages of UMTS and the coverage benefits of GSM with the same terminal. Terminal 150 may be fixed or mobile and may also be called a user equipment (UE), a mobile station (MS), a mobile equipment (ME), and so on. Terminal 150 may be a cellular phone, a personal digital assistant (PDA), a wireless modem, a wireless communication device, a handheld device, a subscriber unit, and so on.

Terminal 150 may be designed to operate on one or more frequency bands commonly used for wireless communication. Table 1 lists the frequency bands that are commonly used for UMTS and GSM as well as the uplink/transmit frequency range and the downlink/receive frequency range for each band.

provides a primary received signal (Prx) that includes versions of the transmitted RF modulated signals. Similarly, antenna 210b receives the RF modulated signals and provides a diversity received signal (Drx) that includes different versions of the transmitted RF modulated signals. A switch and filter unit 220 receives the Prx and Drx signals, filters each received signal to remove out-of-band components, provides one received signal as a first RF input signal (Sin1) to receiver 230a, and provides the other received signal as a second RF input signal (Sin2) to receiver 230b. Several designs of switch and filter unit 220 are described below.

Figure 2:
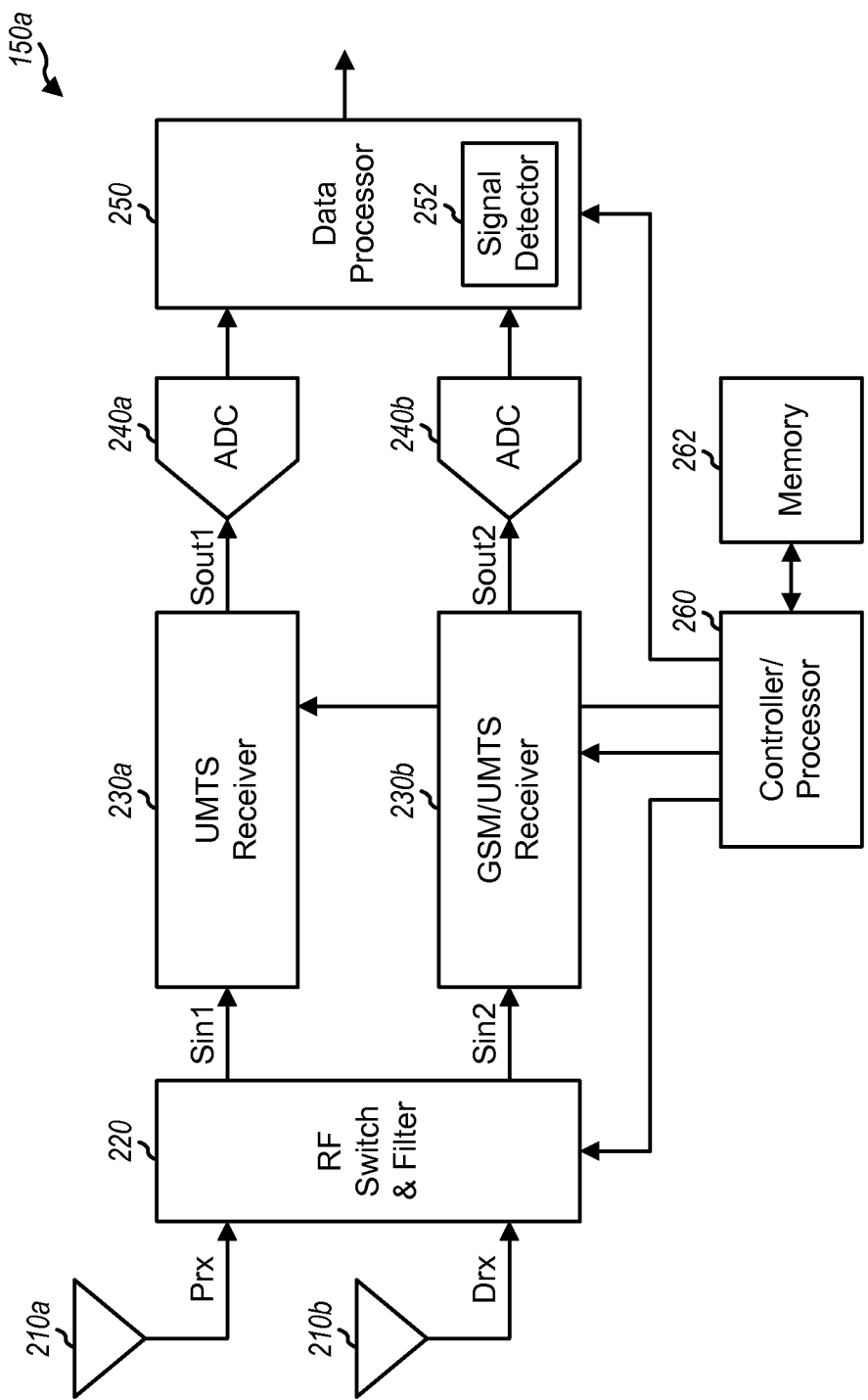
FIG. 2 shows a terminal capable of receiving UMTS with diversity and GSM.

In the embodiment shown in FIG. 2, receiver 230a is a primary receiver for UMTS and is designed to provide good performance for UMTS. Receiver 230b is a primary receiver for GSM and is designed to provide good performance for GSM. Each receiver 230 may be designed to meet applicable requirements for its designated system and may be used for that system in all operating conditions, e.g., over a specified range of received signal levels. The system requirements may pertain to linearity, dynamic range, sensitivity, out-of-band rejection, and so on. Receiver 230b is also a secondary receiver for UMTS but may not be spec-compliant for UMTS. Several designs of receivers 230a and 230b are described below. In the following description, "GSM/UMTS" means that GSM is primary (e.g., spec-compliant) and UMTS is secondary (e.g., supported but non spec-compliant). Similarly, "UMTS/GSM" means that UMTS is primary and GSM is secondary. As used herein, "spec-compliant" means compliant with applicable system requirements, and "non-spec compliant" means not fully compliant with all of the applicable system requirements.

Receiver 230a processes the Sin1 signal and provides a first output baseband signal (Sout1) to an analog-to-digital converter (ADC) 240a. Similarly, receiver 230b processes

TABLE 1

| GSM Frequency Band | UMTS Frequency Band | Uplink/ Transmit (MHz) | Downlink/ Receive (MHz) | Common Name |
|---|---|---|---|---|
|  | UMTS Band I | 1920 - 1980 | 2110 - 2170 | IMT-2000 |
| GSM 1900 | UMTS Band II | 1850 - 1910 | 1930 - 1990 | PCS |
| GSM 1800 | UMTS Band III | 1710 - 1785 | 1805 - 1880 | DCS |
|  | UMTS Band IV | 1710 - 1755 | 2110 - 2155 | AWS |
| GSM 850 | UMTS Band V | 824 - 849 | 869 - 894 | Cellular |
|  | UMTS Band VI | 830 - 840 | 875 - 885 |  |
|  | UMTS Band VII | 2500 - 2570 | 2620 - 2690 |  |
| GSM 900 | UMTS Band VIII | 880 - 915 | 925 - 960 | EGSM |
|  | UMTS Band IX | 1749.9 - 1784.9 | 1844.9 - 1879.9 |  |

FIG. 2 shows a block diagram of a terminal 150a capable of receiving GSM and UMTS, with receive diversity for UMTS. Terminal 150a is an embodiment of terminal 150 in FIG. 1. In this embodiment, terminal 150a includes two antennas 210a and 210b and two receivers 230a and 230b. The two antennas 210a and 210b may be formed in various manners. In an embodiment, antenna 210a is a dipole antenna (e.g., a pull-out antenna often used for a cellular phone), has better performance (e.g., higher antenna gain), and is designated as a primary antenna. In an embodiment, antenna 210b is a patch antenna formed with printed traces on a circuit board, has worse performance (e.g., lower antenna gain), and is designated as a diversity or secondary antenna. In other embodiments, antennas 210a and 210b may be formed in other manners with wire conductors, printed traces, and so on, as is known in the art.

Antenna 210a receives RF modulated signals transmitted by base stations in the GSM and UMTS networks and the Sin2 signal and provides a second output baseband signal (Sout2) to an ADC 240b. ADC 240a digitizes the Sout1 signal and provides a first stream of data samples to a data processor 250 for further processing. ADC 240b digitizes the Sout2 signal and provides a second stream of data samples to data processor 250. Although not shown in FIG. 2 for simplicity, each output baseband signal and each data sample stream may be a complex signal/stream having an inphase (I) component and a quadrature (Q) component.

In the embodiment shown in FIG. 2, a signal detector 252 measures the level of a desired signal, which is a signal within an RF channel of interest. The desired signal detection may be performed in various manners known in the art. For example, an automatic gain control (AGC) loop is typically used to adjust the gains of variable gain amplifiers (VGAs) within the receivers so that output baseband signals at the proper amplitude are provided to the ADCs. The gain control signals for these VGAs are indicative of, and may be mapped to, the desired signal level. Although not shown in FIG. 2, a jammer detector may detect for the presence of jammers, which are large amplitude undesired signals near the desired signal. The jammer detector may provide a status signal indicating whether or not jammers are present. The outputs from the signal detector and the jammer detector may be used to control the operation of receivers 230a and 230b.

A controller/processor 260 directs the operation of various units at terminal 150a. Controller/processor 260 may control the routing of the Prx and Drx signals to receivers 230a and 230b depending on which system is being received (e.g., UMTS or GSM). Controller/processor 260 may further control the operation of receivers 230a and 230b and data processor 250 for the system being received. A memory 262 stores program codes and data for terminal 150a.

To receive UMTS with diversity, primary antenna 210a is coupled to UMTS receiver 230a, and diversity antenna 210b is coupled to GSM/UMTS receiver 230b. Both receivers 230a and 230b are operational and process the received signals from antennas 210a and 210b, respectively. To receive GSM without diversity, primary antenna 210a is coupled to GSMNUMTS receiver 230b, which processes the received signal from antenna 210a. UMTS receiver 230a may be powered down to conserve power.

Figure 3:
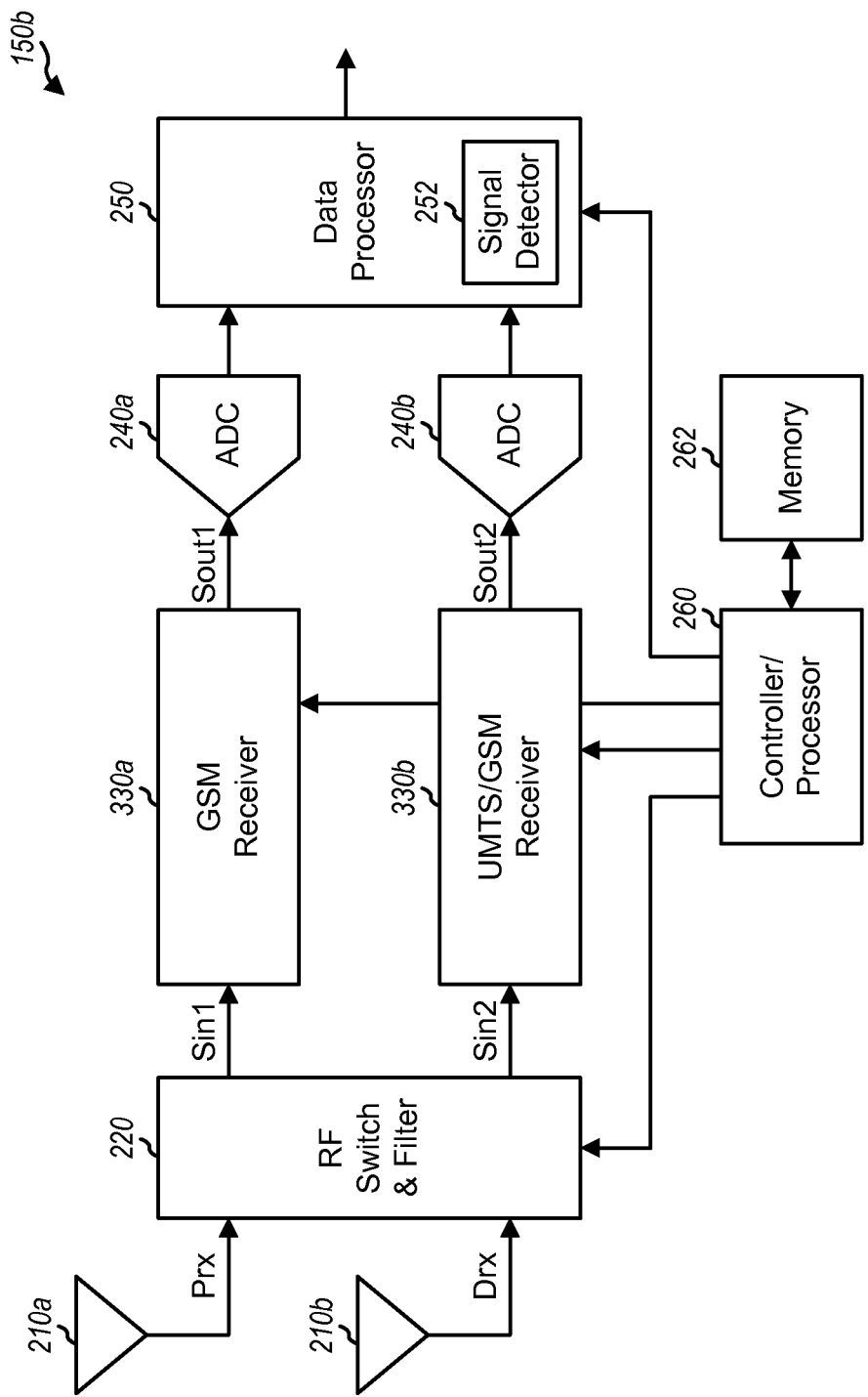
FIG. 3 shows a terminal capable of receiving GSM with diversity and UMTS.

FIG. 3 shows a block diagram of a terminal 150b capable of receiving GSM and UMTS, with receive diversity for GSM. Terminal 150b is another embodiment of terminal 150 in FIG. 1. In this embodiment, terminal 150b includes all of the units in terminal 150a in FIG. 2 except that receivers 230a and 230b are replaced with receivers 330a and 330b, respectively. Receiver 330a is a primary receiver for GSM and may be designed to be spec-compliant for GSM. Receiver 330b is a primary receiver for UMTS and may be designed to be spec-compliant for UMTS. Receiver 330b is also a secondary receiver for GSM and may or may not be spec-compliant for GSM. Several designs of receivers 330a and 330b are described below.

To receive GSM with diversity, primary antenna 210a is coupled to GSM receiver 330a, and diversity antenna 210b is coupled to UMTS/GSM receiver 330b. Both receivers 330a and 330b are operational and process the received signals from antennas 210a and 210b, respectively. To receive UMTS without diversity, primary antenna 210a is coupled to UMTS/GSM receiver 330b, which processes the received signal from antenna 210a. GSM receiver 330a may be powered down to conserve power.

Figure 4:
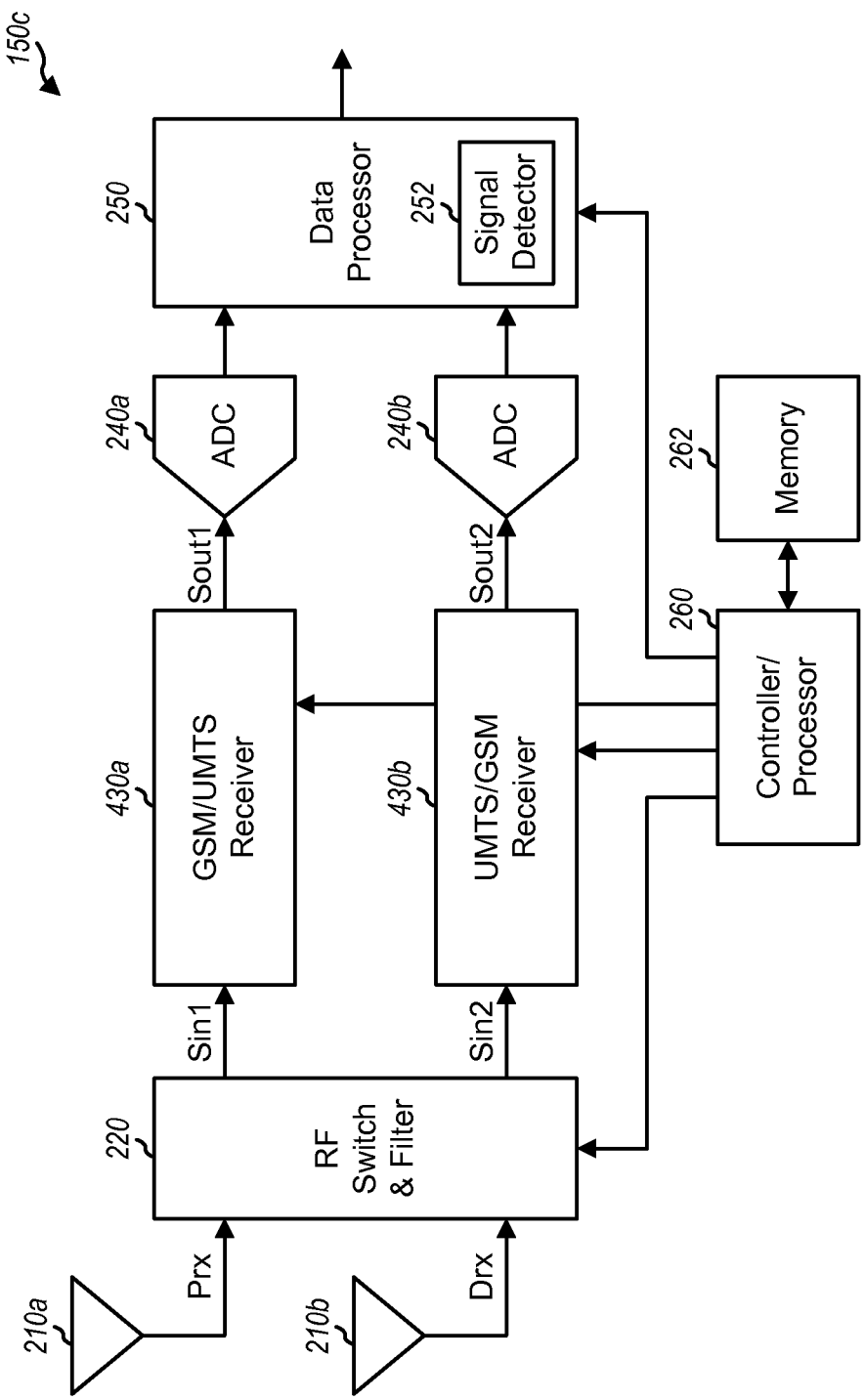
FIG. 4 shows a terminal capable of receiving GSM and UMTS with diversity.

FIG. 4 shows a block diagram of a terminal 150c capable of receiving GSM and UMTS, with receive diversity for both GSM and UMTS. Terminal 150c is yet another embodiment of terminal 150 in FIG. 1. In this embodiment, terminal 150c includes all of the units in terminal 150a in FIG. 2 except that receivers 230a and 230b are replaced with receivers 430a and 430b, respectively. Receiver 430a is a primary receiver for GSM and may be designed to be spec-compliant for GSM. Receiver 430b is a primary receiver for UMTS and may be designed to be spec-compliant for UMTS. Receiver 430a is also a secondary receiver for UMTS and may or may not be spec-compliant for UMTS. Receiver 430b is also a secondary receiver for GSM and may or may not be spec-compliant for GSM. Several designs of receivers 430a and 430b are described below.

To receive GSM with diversity, primary antenna 210a is coupled to GSM/UMTS receiver 430a, and diversity antenna 210b is coupled to UMTS/GSM receiver 430b. Both receivers 430a and 430b are operational and process the received signals from antennas 210a and 210b, respectively. To receive UMTS with diversity, primary antenna 210a is coupled to UMTS/GSM receiver 430b, and diversity antenna 210b is coupled to GSM/UMTS receiver 430a. Both receivers 430a and 430b are operational and process the received signals from antennas 210b and 210a, respectively.

Figure 5:
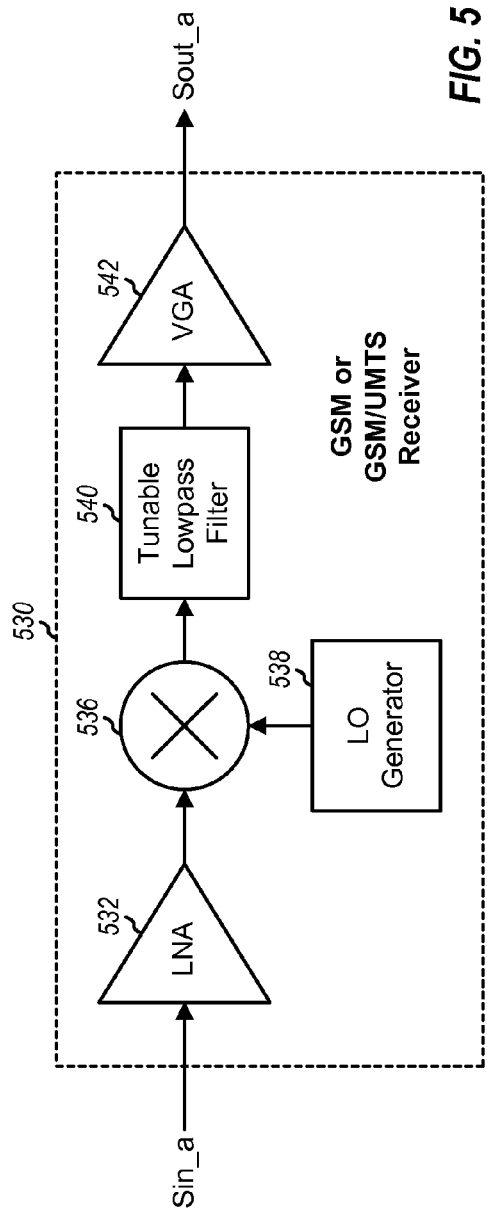
FIG. 5 shows a receiver for GSM and possibly supporting UMTS.

FIG. 5 shows a block diagram of an embodiment of a receiver 530. Receiver 530 may used as the primary receiver for GSM and may also be designed to receive UMTS. Receiver 530 may be used for GSM/UMTS receiver 230b in FIG. 2, GSM receiver 330a in FIG. 3, and GSM/UMTS receiver 430a in FIG. 4.

Within receiver 530, a low noise amplifier (LNA) 532 receives and amplifies an RF input signal (Sin_a) with a fixed or variable gain and provides an amplified signal. The Sin_a signal may be the Sin1 or Sin2 signal in FIGS. 2 through 4. A downconverter 536 frequency downconverts the amplified signal with a local oscillator (LO) signal from an LO generator 538 and provides a downconverted signal. The frequency of the LO signal is selected such that the signal component in an RF channel of interest is downconverted to baseband or near-baseband. For GSM, a frequency band covers many RF channels, and each RF channel has a bandwidth of 200 KHz. For UMTS, a frequency band also covers many RF channels. Each RF channel has a bandwidth of 3.84 MHz, but the spacing between RF channels is 5 MHz.

A lowpass filter (LPF) 540 filters the downconverted signal to pass the signal components in the RF channel of interest and to remove noise and undesired signals that may be generated by the downconversion process. Lowpass filter 540 may be designed with a relatively sharp roll-off in order to attenuate jammers. These jammers may take up a large portion of the dynamic range of the subsequent ADC if they are not sufficiently attenuated. Lowpass filter 540 may be implemented with various filter types (e.g., Butterworth, elliptical, Chebychev, and so on), with the proper filter order and bandwidth, and with sufficient bias current to meet linearity and dynamic range requirements. Lowpass filter 540 provides a filtered baseband signal. A VGA 542 amplifies and buffers the filtered baseband signal and provides an output baseband signal (Sout_a), which may be the Sout1 or Sout2 signal in FIGS. 2 through 4.

In an embodiment, receiver 530 is used to receive only GSM. In this embodiment, the circuit blocks in receiver 530 may be designed specifically for GSM. Lowpass filter 540 may have a fixed bandwidth for one GSM RF channel. LO generator 538 may provide the LO signal at any one of the supported GSM RF channels. The circuit blocks may be designed to provide the required linearity and dynamic range for GSM.

In another embodiment, receiver 530 is used to receive both GSM and UMTS. In this embodiment, the circuit blocks in receiver 530 may be designed to be spec-compliant for GSM and still be able to receive UMTS. Lowpass filter 540 may be a tunable filter having an adjustable bandwidth of 100 KHz for one GSM RF channel when receiving GSM or 1.92 MHz for one UMTS RF channel when receiving UMTS. The filter bandwidth is half of the RF channel bandwidth. LO generator 538 may provide the LO signal at any one of the supported GSM and UMTS RF channels.

Figure 6:
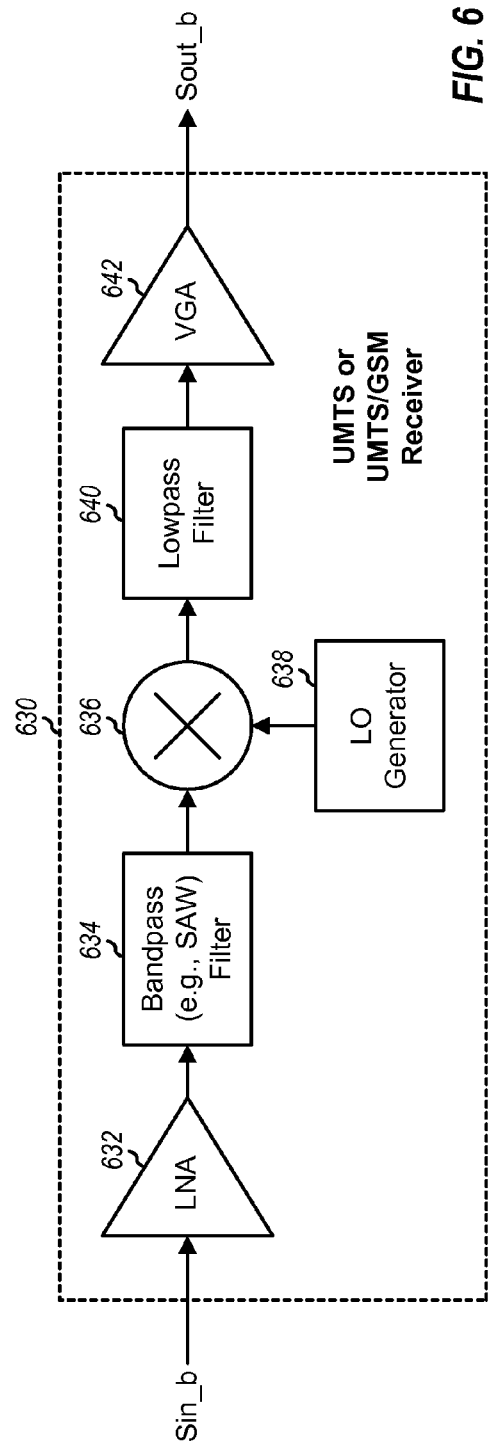
FIG. 6 shows a receiver for UMTS and possibly supporting GSM.

FIG. 6 shows a block diagram of an embodiment of a receiver 630. Receiver 630 may be used as the primary receiver for UMTS and may also be designed to receive GSM. Receiver 630 may be used for UMTS receiver 230a in FIG. 2, UMTS/GSM receiver 330b in FIG. 3, and UMTS/GSM receiver 430b in FIG. 4.

Within receiver 630, an LNA 632 receives and amplifies an RF input signal (Sin_b) with a fixed or variable gain and provides an amplified signal. The Sin_b signal may be the Sin1 or Sin2 signal in FIGS. 2 through 4.

A bandpass filter (BPF) 634 filters the amplified signal to pass signal components in the band of interest and to remove out-of-band noise and undesired signals. UMTS is a full-duplex system in which signals may be transmitted and received simultaneously on two frequency ranges, as shown in Table 1. A terminal may thus transmit an RF modulated signal on the uplink and concurrently receive an RF input signal on the downlink. The RF modulated signal transmitted by the terminal is typically much larger in amplitude than the received RF input signal. Bandpass filter 634 may pass the RF components for an entire receive frequency range (e.g., from 869 to 894 MHz for the cellular band) and may suppress the RF components for a transmit frequency range (e.g., from 824 to 849 MHz for the cellular band). Bandpass filter 634 may have a passband that corresponds to the entire receive frequency range in the band of interest. Because of the potentially large difference in the transmit and receive signal levels, bandpass filter 634 provides a large amount of out-of-band rejection in order to meet system requirements. Bandpass filter 634 may be implemented with a surface acoustic wave (SAW) filter, which has a sharp roll-off and is commonly used for applications requiring large attenuation of out-of-band signals. Bandpass filter 634 may also be implemented with a ceramic filter or some other type of filter. Bandpass filter 634 may also be omitted.

Downconverter 636, LO generator 638, lowpass filter 640, and VGA 642 may process the filtered signal from bandpass filter 634 in the manner described above for FIG. 5. VGA 642 provides an output baseband signal (Sout$_{13}$ b), which may be the Sout1 or Sout2 signal in FIGS. 2 through 4.

In an embodiment, receiver 630 is used to receive only UMTS. In this embodiment, the circuit blocks in receiver 630 may be designed specifically for UMTS. Lowpass filter 640 may have a fixed bandwidth for one UMTS RF channel. In another embodiment, receiver 630 is used to receive both UMTS and GSM. In this embodiment, the circuit blocks in receiver 630 may be designed to be spec-compliant for UMTS and still be able to receive GSM. Lowpass filter 640 may be a tunable filter having an adjustable bandwidth for one UMTS RF channel when receiving UMTS and one GSM RF channel when receiving GSM.

FIGS. 5 and 6 show specific designs for two receiver designs. In general, a receiver may implement a super-heterodyne architecture or a direct-to-baseband architecture. In the super-heterodyne architecture, the RF input signal is frequency downconverted in multiple stages, e.g., from RF to an intermediate frequency (IF) in one stage, and then from IF to baseband in another stage. In the direct-to-baseband architecture, which is shown in FIGS. 5 and 6, the RF input signal is frequency downconverted from RF directly to baseband in one stage. The super-heterodyne and direct-to-baseband architectures may use different circuit blocks and/or have different circuit requirements.

In general, a receiver may perform signal conditioning with one or more stages of amplifier, filter, mixer, and so on. A receiver may include different and/or additional circuit blocks not shown in FIGS. 5 and 6. For example, additional amplifiers may be inserted prior to downconverters 536 and 636. Furthermore, the circuit blocks may be arranged differently from the arrangement shown in FIGS. 5 and 6. For example, lowpass filters 540 and 640 may be swapped with VGAs 542 and 642, respectively.

Figure 7A:
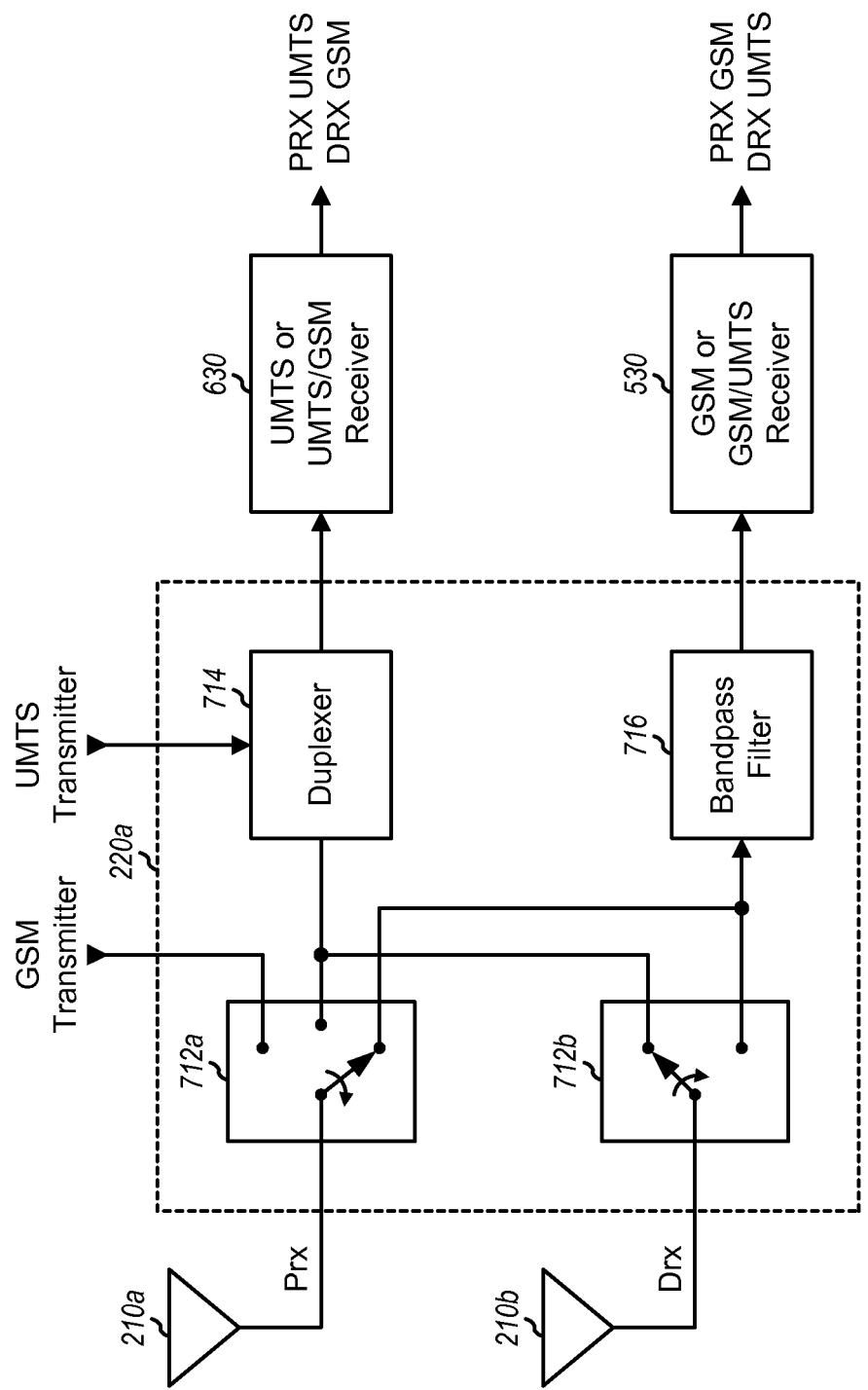
FIGS. 7A and 7B show two units that perform filtering and RF switching.

FIG. 7A shows a block diagram of a switch and filter unit 220a, which is an embodiment of unit 220 in FIGS. 2 through 4. Within unit 220a, an RF switch 712a has its input coupled to primary antenna 210a, a first output coupled to a GSM transmitter, a second output coupled to a duplexer 714, and a third output coupled to a bandpass filter 716. An RF switch 712b has its input coupled to diversity antenna 210b, a first output coupled to duplexer 714, and a second output coupled to bandpass filter 716. Duplexer 714 has another input coupled to a UMTS transmitter and an output coupled to receiver 630. Bandpass filters 716 filters a received RF signal from RF switch 712a or 712b to pass signal components in the band of interest and provides an RF input signal to receiver 530. Bandpass filter 716 may pass an entire receive frequency range for a band of interest and may have a bandwidth of 10 to 75 MHz depending on the frequency band, as shown in Table 1. Bandpass filter 716 may be implemented with a SAW filter, a ceramic filter, or some other type of filter.

UMTS is a full-duplex system in which signals are simultaneously transmitted and received on different frequency ranges. To transmit/receive UMTS, RF switch 712a couples primary antenna 210a to duplexer 714. Duplexer 714 routes an RF modulated signal from the UMTS transmitter to primary antenna 210a and further routes a received RF signal from the primary antenna to UMTS receiver 630. Duplexer 714 also performs filtering of the received RF signal. RF switch 712b couples diversity antenna 210b to bandpass filter 716. Receiver 630 processes the Prx signal from primary antenna 210a and provides a primary output baseband signal for UMTS (PRX UMTS). Receiver 530 processes the Drx signal from diversity antenna 210b and provides a diversity output baseband signal for UMTS (DRX UMTS).

GSM is a half-duplex system in which signals are transmitted and received in different time intervals. To transmit/receive GSM, RF switch 712a couples primary antenna 210a between the GSM transmitter and bandpass filter 716 for GSM receiver 530 at appropriate times. RF switch 712b couples diversity antenna 210b to duplexer 714. Receiver 530 processes the Prx signal from primary antenna 210a and provides a primary output baseband signal for GSM (PRX GSM). Receiver 630 processes the Drx signal from diversity antenna 210b and provides a diversity output baseband signal for GSM (DRX GSM).

Figure 7B:
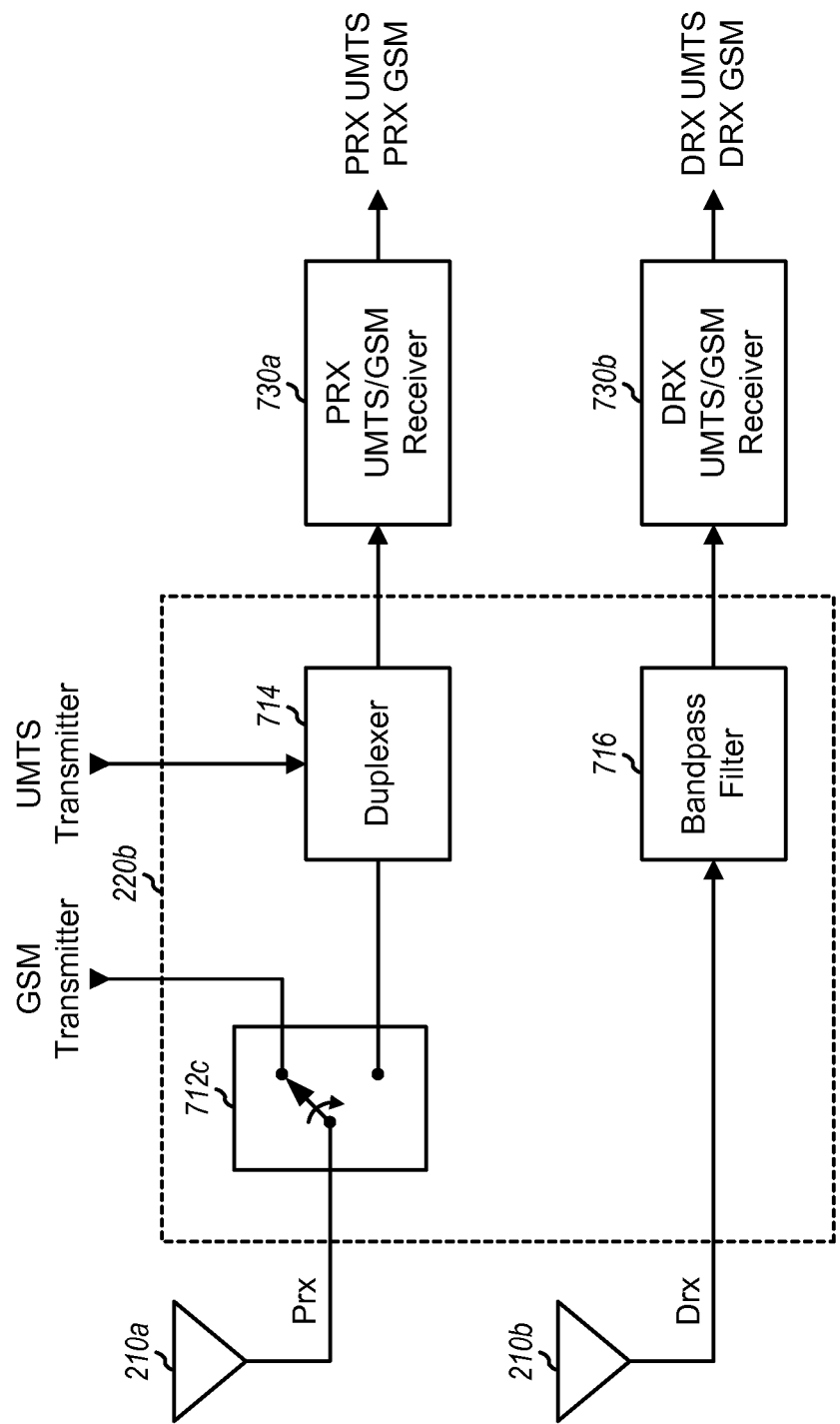

FIG. 7B shows a block diagram of a switch and filter unit 220b, which is another embodiment of unit 220 in FIGS. 2 through 4. Within unit 222b, an RF switch 712c has its input coupled to primary antenna 210a, a first output coupled to a GSM transmitter, and a second output coupled to duplexer 714. Diversity antenna 210b is coupled directly to bandpass filter 716.

To transmit/receive UMTS, RF switch 712c couples primary antenna 210a to duplexer 714, which couples the UMTS transmitter and a primary receiver 730a to the primary antenna. Receiver 730a processes the Prx signal from primary antenna 210a and provides PRX UMTS. A receiver 730b processes the Drx signal from diversity antenna 210b and provides DRX UMTS. To transmit/receive GSM, RF switch 712c couples primary antenna 210a between the GSM transmitter and duplexer 714 at appropriate times. Receiver 730a processes the Prx signal and provides PRX GSM. Receiver 730b processes the Drx signal and provides DRX GSM.

In the embodiments shown in FIGS. 7A and 7B, duplexer 714 passes the received RF signal for both UMTS and GSM, and bandpass filter 716 also passes the received RF signal for both UMTS and GSM. In the embodiment shown in FIG. 7A, receiver 630 is the primary receiver for UMTS and the diversity receiver for GSM, and receiver 530 is the primary receiver for GSM and the diversity receiver for UMTS. Receiver 630 may be spec-compliant for UMTS, and receiver 530 may be spec-compliant for GSM. In the embodiment shown in FIG. 7B, receiver 730a is the primary receiver for both UMTS and GSM, and receiver 730b is the diversity receiver for both UMTS and GSM. Receiver 730a may be spec-compliant for both UMTS and GSM.

Figure 8A:
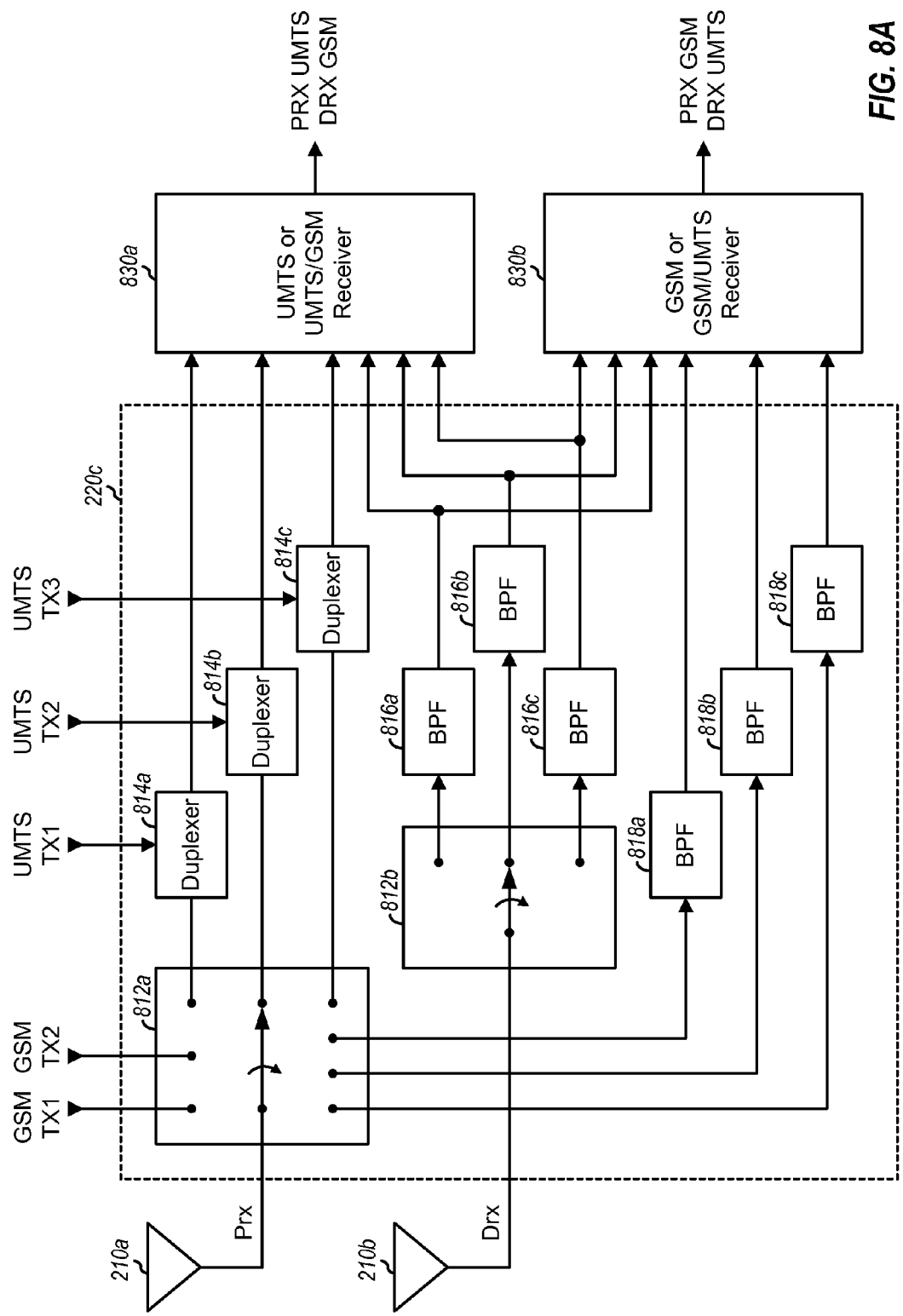
FIGS. 8A and 8B show two units that perform filtering and RF switching for multiple frequency bands.

FIG. 8A shows a block diagram of a switch and filter unit 220c, which is yet another embodiment of unit 220 in FIGS. 2 through 4. Unit 220c supports operation on three frequency bands, which may be any of the ones listed in Table 1 and/or other frequency bands. Within unit 220c, an RF switch 812a has its input coupled to primary antenna 210a, two outputs coupled to two GSM transmitters for two frequency bands, another three outputs coupled to duplexers 814a, 814b and 814c for three frequency bands, and yet another three outputs coupled to bandpass filters (BPFs) 818a, 818b and 818c for three frequency bands. An RF switch 812b has its input coupled to diversity antenna 210b and three outputs coupled to bandpass filters 816a, 816b and 816c for three frequency bands.

To transmit/receive UMTS on a given desired frequency band, RF switch 812a couples primary antenna 210a to a duplexer 814 for the desired frequency band, which couples a UMTS transmitter and a receiver 830a to the primary antenna. RF switch 812b couples diversity antenna 210b to a bandpass filter 816 for the desired frequency band, which further couples to a receiver 830b. Receiver 830a processes the Prx signal from primary antenna 210a and provides PRX UMTS. Receiver 830b processes the Drx signal from diversity antenna 210b and provides DRX UMTS.

To transmit/receive GSM on a given desired frequency band, RF switch 812a couples primary antenna 210a between a GSM transmitter and a bandpass filter 818 for the desired frequency band. RF switch 812b couples diversity antenna 210b to a bandpass filter 816 for the desired frequency band. Receiver 830b processes the Prx signal from primary antenna 210a and provides PRX GSM. Receiver 830a processes the Drx signal from diversity antenna 210b and provides DRX GSM.

Figure 8B:
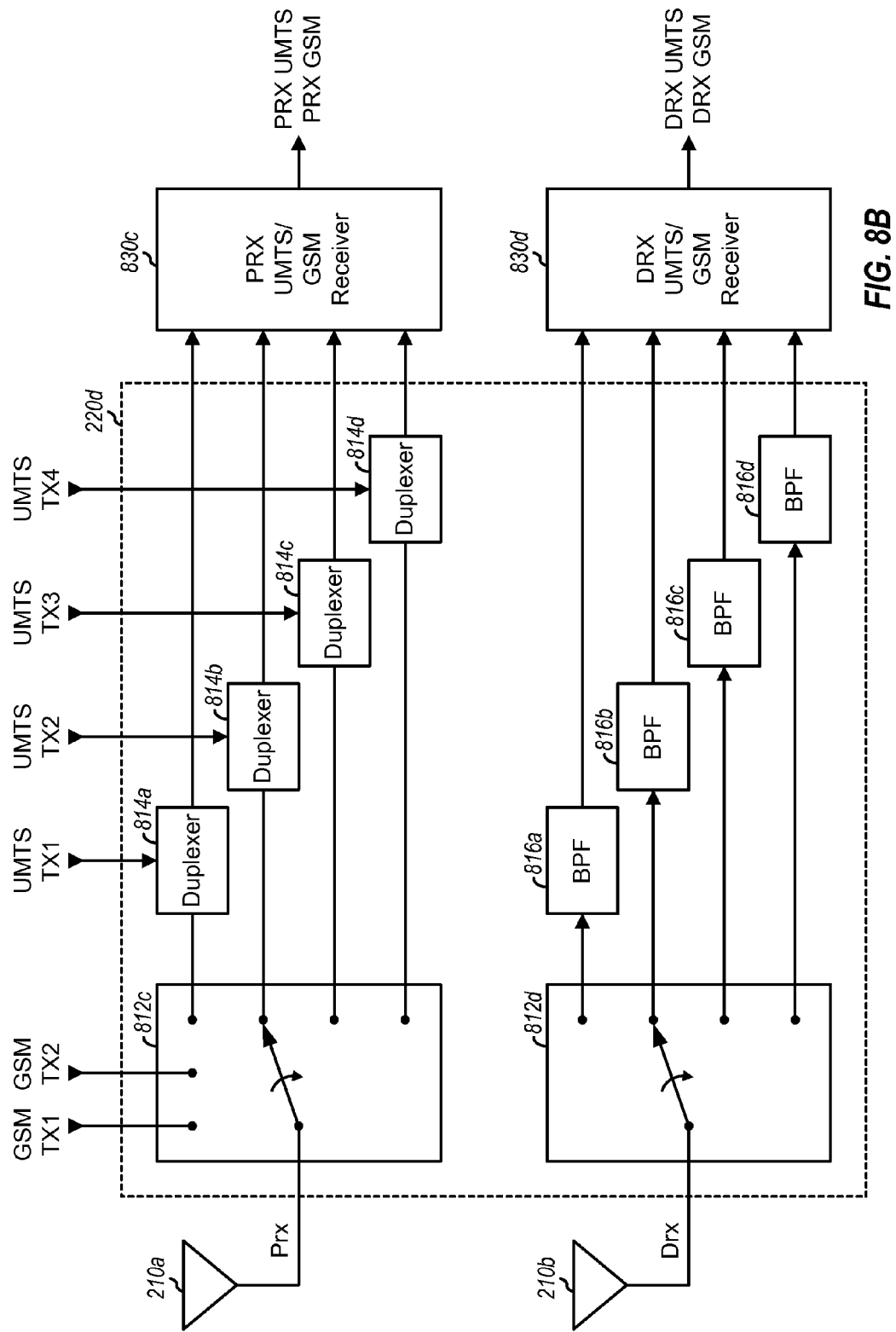

FIG. 8B shows a block diagram of a switch and filter unit 220d, which is yet another embodiment of unit 220 in FIGS. 2 through 4. Unit 220d supports operation on four frequency bands, which may be any of the ones listed in Table 1 and/or other frequency bands. Within unit 220d, an RF switch 812c has its input coupled to primary antenna 210a, two outputs coupled to two GSM transmitters for two frequency bands, and another four outputs coupled to duplexers 814a, 814b, 814c and 814d for four frequency bands. An RF switch 812d has its input coupled to diversity antenna 210b and four outputs coupled to bandpass filters 816a, 816b, 816c and 816d for four frequency bands.

To transmit/receive UMTS on a given desired frequency band, RF switch 812c couples primary antenna 210a to a duplexer 814 for the desired frequency band, which couples a UMTS transmitter and a receiver 830c to the primary antenna. RF switch 812d couples diversity antenna 210b to a bandpass filter 816 for the desired frequency band, which further couples to a receiver 830d. Receiver 830c processes the Prx signal from primary antenna 210a and provides PRX UMTS. Receiver 830d processes the Drx signal from diversity antenna 210b and provides DRX UMTS.

To transmit/receive GSM on a given desired frequency band, RF switch 812c couples primary antenna 210a between a GSM transmitter and a duplexer 814 for the desired frequency band. RF switch 812d couples diversity antenna 210b to a bandpass filter 816 for the desired frequency band. Receiver 830c processes the Prx signal from primary antenna 210a and provides PRX GSM. Receiver 830d processes the Drx signal from diversity antenna 210b and provides DRX GSM.

In the embodiment shown in FIG. 8A, duplexers 814a through 814c pass the received RF signal for UMTS, bandpass filters 818a through 818c pass the received RF signal for GSM, and bandpass filters 816a through 816c pass the received RF signal for both UMTS and GSM. Receiver 830a is the primary receiver for UMTS and the diversity receiver for GSM, and receiver 830b is the primary receiver for GSM and the diversity receiver for UMTS. Receiver 830a may be spec-compliant for UMTS, and receiver 830b may be spec-compliant for GSM. In the embodiment shown in FIG. 8B, duplexers 814a through 814d pass the received RF signal for both UMTS and GSM, and bandpass filters 816a through 816d also pass the received RF signal for both UMTS and GSM. Receiver 830c is the primary receiver for both UMTS and GSM, and receiver 830d is the diversity receiver for both UMTS and GSM. Receiver 830c may be spec-compliant for both UMTS and GSM.

Figure 9:
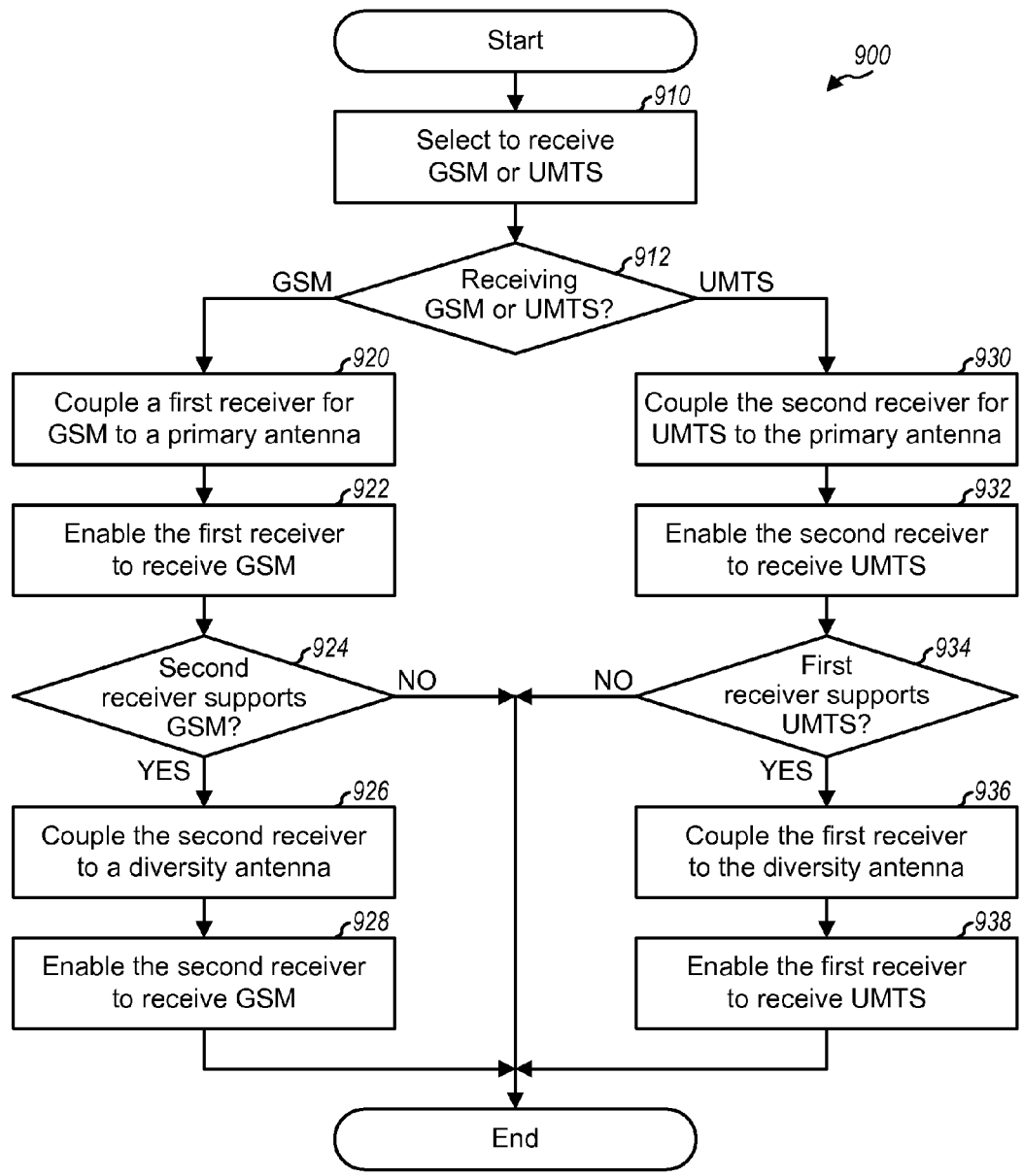
FIG. 9 shows a process to receive GSM and UMTS.

FIG. 9 shows an embodiment of a process 900 performed by a terminal to receive GSM and UMTS. The terminal has a first receiver for GSM and a second receiver for UMTS. The first receiver may or may not support UMTS, and the second receiver may or may not support GSM. The terminal supports receive diversity for GSM and/or UMTS.

The terminal selects to receive either GSM or UMTS (block 910). If GSM is selected, as determined in block 912, then the first receiver for GSM is coupled to the primary antenna (block 920) and is enabled to receive GSM (block 922). If the second receiver also supported GSM (e.g., in the embodiments shown in FIGS. 3 and 4), as determined in block 924, then the second receiver is coupled to the diversity antenna (block 926) and is enabled to receive GSM (block 928).

If UMTS is selected, as determined in block 912, then the second receiver for UMTS is coupled to the primary antenna (block 930) and is enabled to receive UMTS (block 932). If the first receiver also supported UMTS (e.g., in the embodiments shown in FIGS. 2 and 4), as determined in block 934, then the first receiver is coupled to the diversity antenna (block 936) and is enabled to receive UMTS (block 938).

The primary receiver for each system is typically designed to be spec-compliant. This often entails biasing the circuit blocks in the receiver with sufficient bias current in order to meet linearity and dynamic range requirements for the worst-case operating conditions, which typically correspond to low desired signal level and large jammer level. However, the worst-case conditions are often not encountered and, in such instances, the primary receiver may be operated with lower bias current in order to reduce power consumption. One or more detectors may be used to ascertain the operating conditions, e.g., to detect for the desired signal level and/or the jammer level. The bias current for the receiver may be adjusted based on the detected operating conditions.

When operating two receivers simultaneously for receive diversity, the secondary receiver may be operated with lower bias current to reduce power consumption. Receive diversity generally relies on the primary and diversity antennas being somewhat uncorrelated, so that when one antenna is in deep fade the other antenna is not also in deep fade. Hence, when the primary antenna is in deep fade, the diversity antenna is typically not in deep fade, and the secondary receiver is processing a received signal that is not weak and may then be operated at lower bias current.

Receive diversity may also be enabled or disabled based on the detected operating conditions for the primary receiver. For example, receive diversity may be enabled whenever the desired signal level for the primary receiver is detected to be low and may be disabled otherwise.

For clarity, the diversity receiver has been specifically described for GSM and UMTS. The diversity receiver may also be used for other systems. The diversity receiver may be designed with (1) a first receiver to receive one or more TDMA systems and possibly one or more CDMA systems and (2) a second receiver to receive the one or more CDMA systems and possibly the one or more TDMA systems. The TDMA system(s) may include GSM and/or other TDMA systems. The CDMA system(s) may include W-CDMA, cdma2000, and/or other CDMA systems. For example, the diversity receiver may support a combination of GSM and 1×, a combination of UMTS and 1×, a combination of GSM, UMTS and 1×, and so on. Lowpass filter 540 in FIG. 5 and lowpass filter 640 in FIG. 6 may be designed with adjustable bandwidth of 100 KHz for one GSM RF channel, 1.92 MHz for one W-CDMA RF channel, and/or 610 KHz for one 1× RF channel.

All or a large portion of the diversity receiver may be implemented on one or more RF integrated circuits (RFICs). For example, the switch and filter section and the receivers, except the SAW filters, may be implemented on one or more RFICs. The diversity receiver may also be fabricated with various IC process technologies such as complementary metal oxide semiconductor (CMOS), bipolar junction transistor (BJT), bipolar-CMOS (BiCMOS), silicon germanium (SiGe), gallium arsenide (GaAs), and so on. The diversity receiver may also be implemented with discrete circuit components.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. An apparatus comprising:
a first receiver for Universal Mobile Telecommunications System (UMTS); and
a second receiver for Global System for Mobile Communications (GSM) and UMTS, wherein at least one of the first and second receivers is non-spec compliant for at least one of GSM and UMTS and the at least one is reconfigurably couplable with primary and diversity antennas, at least one of the first and second receivers configured to adjust a bias current based on detected operation conditions and a non-spec compliant receiver being operative to receive communications pursuant to a first specification with a bias current lower than a bias current of a receiver compliant with the first specification.

2. The apparatus of claim 1, wherein the first receiver comprises a bandpass filter to attenuate a transmit frequency range for UMTS.

3. The apparatus of claim 1, wherein the second receiver comprises a lowpass filter having a bandwidth that is adjustable for GSM and UMTS.

4. The apparatus of claim 3, wherein the lowpass filter is set to a bandwidth of 100 KHz for GSM and to a bandwidth of 1.92 MHz for UMTS.

5. The apparatus of claim 1, wherein the second receiver is operated with full bias current when receiving GSM and with reduced bias current when receiving UMTS.

6. The apparatus of claim 1, wherein the first receiver is spec-compliant for UMTS and the second receiver is spec-compliant for GSM.

7. The apparatus of claim 1, further comprising:
a unit configured to couple the first receiver to a primary antenna and the second receiver to a diversity antenna when receiving UMTS and to couple the second receiver to the primary antenna when receiving GSM.

8. The apparatus of claim 7, wherein the primary and diversity antennas are two different types of antenna, with the primary antenna having better performance than the diversity antenna.

9. The apparatus of claim 7, wherein the unit comprises a switch configured to couple the primary antenna to the first or second receiver.

10. The apparatus of claim 9, wherein the unit further comprises
a duplexer coupled between the switch and the first receiver, and
a bandpass filter coupled between the switch and the second receiver.

11. The apparatus of claim 1, wherein the second receiver comprises
a downconverter used for both GSM and UMTS.

12. The apparatus of claim 1, wherein the second receiver comprises
a low noise amplifier (LNA) used for both GSM and UMTS.

13. The apparatus of claim 1, wherein the second receiver comprises
a variable gain amplifier (VGA) used for both GSM and UMTS.

14. The apparatus of claim 1, further comprising:
at least one detector configured to determine operation conditions for the apparatus; and
a controller configured to control operation of the first and second receivers based on the determined operation conditions.

15. An apparatus comprising:
means for receiving Universal Mobile Telecommunications System (UMTS); and
means for receiving Global System for Mobile Communications (GSM) and UMTS using at least one common circuit block, wherein at least one of the means for receiving is non-spec compliant for at least one of GSM and UMTS and the at least one is reconfigurably couplable with primary and diversity antennas, at least one of the means for receiving UMTS and the means for receiver GSM and UMTS configured to adjust a bias current based on detected operation conditions and a non-spec compliant means for receiving being operative to receive communications pursuant to a first specification with a bias current lower than a bias current of a means for receiving which is compliant with the first specification.

16. The apparatus of claim 15, wherein the means for receiving GSM and UMTS comprises means for filtering with a bandwidth that is adjustable for GSM and UMTS.

17. The apparatus of claim 15, further comprising:
means for coupling a primary antenna to the means for receiving UMTS and the means for receiving GSM and UMTS.

18. An apparatus comprising:
a first receiver for Global System for Mobile Communications (GSM); and
a second receiver for Universal Mobile Telecommunications System (UMTS) and GSM, wherein at least one of the first and second receivers is non-spec compliant for at least one of GSM and UMTS and the at least one is reconfigurably couplable with primary and diversity antennas, at least one of the first and second receivers configured to adjust a bias current based on detected operation conditions and a non-spec compliant receiver being operative to receive communications pursuant to a first specification with a bias current lower than a bias current of a receiver compliant with the first specification.

19. The apparatus of claim 18, wherein the second receiver comprises
a lowpass filter having a bandwidth that is adjustable for UMTS and GSM.

20. The apparatus of claim 18, wherein the first receiver is spec-compliant for GSM and the second receiver is spec-compliant for UMTS.

21. The apparatus of claim 18, further comprising:
a unit configured to couple the first receiver to a primary antenna and the second receiver to a diversity antenna when receiving GSM and to couple the second receiver to the primary antenna when receiving UMTS.

22. The apparatus of claim 21, wherein the unit comprises
a switch configured to couple the primary antenna to the first or second receiver.

23. The apparatus of claim 22, wherein the unit further comprises
a bandpass filter coupled between the switch and the first receiver, and
a duplexer coupled between the switch and the second receiver.

24. An apparatus comprising:
a first receiver operative to receive Global System for Mobile Communications (GSM) and Universal Mobile Telecommunications System (UMTS); and
a second receiver operative to receive UMTS and GSM, wherein the first and second receivers are operative to provide receive diversity for UMTS and GSM, wherein at least one of the first and second receivers is non-spec compliant for at least one of GSM and UMTS and the at least one is reconfigurably couplable with primary and diversity antennas, at least one of the first and second receivers configured to adjust a bias current based on detected operation conditions and a non-spec compliant receiver being operative to receive communications pursuant to a first specification with a bias current lower than a bias current of a receiver compliant with the first specification.

25. The apparatus of claim 24, wherein the first receiver is spec-compliant for GSM and the second receiver is spec-compliant for UMTS.

26. The apparatus of claim 25, wherein the first receiver is non-spec compliant for UMTS and the second receiver is non-spec compliant for GSM.

27. The apparatus of claim 24,
wherein the first receiver comprises a first lowpass filter having a bandwidth that is adjustable for GSM and UMTS, and
wherein the second receiver comprises a second lowpass filter having a bandwidth that is adjustable for UMTS and GSM.

28. The apparatus of claim 24, further comprising:
a first switch operative to couple a primary antenna to the first or second receiver; and
a second switch operative to couple a diversity antenna to the first or second receiver.

29. The apparatus of claim 24, wherein the first and second receivers are operable for multiple frequency bands.

30. An apparatus comprising:
a first receiver operative to receive a Time Division Multiple Access (TDMA) system; and
a second receiver operative to receive a Code Division Multiple Access (CDMA) system, wherein the first receiver is further operative to receive the CDMA system, or the second receiver is further operative to receive the TDMA system, or both the first receiver is further operative to receive the CDMA system and the second receiver is further operative to receive the TDMA system, wherein at least one of the first and second receivers is non-spec compliant for at least one of GSM and UMTS and the at least one is reconfigurably couplable with primary and diversity antennas, at least one of the first and second receivers configured to adjust a bias current based on detected operation conditions and a non-spec compliant receiver being operative to receive communications pursuant to a first specification with a bias current lower than a bias current of a receiver compliant with the first specification.

31. The apparatus of claim 30, wherein the TDMA system is a Global System for Mobile Communications (GSM) system and the CDMA system is a Wideband-CDMA (W-CDMA) system.

32. The apparatus of claim 30, wherein the TDMA system is a Global System for Mobile Communications (GSM) system and the CDMA system is a CDMA2000 system.

33. A method comprising:
selecting to receive Global System for Mobile Communications (GSM) or Universal Mobile Telecommunications System (UMTS);
if GSM is selected, enabling a first receiver to receive GSM and enabling a second receiver to receive GSM if supported by the second receiver; and
if UMTS is selected, enabling the second receiver to receive UMTS and enabling the first receiver to receive UMTS if supported by the first receiver, wherein at least one of the first and second receivers is non-spec compliant for at least one of GSM and UMTS and the at least one is reconfigurably couplable with primary and diversity antennas, at least one of the first and second receivers configured to adjust a bias current based on detected operation conditions and a non-spec compliant receiver being operative to receive communications pursuant to a first specification with a bias current lower than a bias current of a receiver compliant with the first specification.

34. The method of claim 33, further comprising:
if GSM is selected, coupling the first receiver to a primary antenna; and
if UMTS is selected, coupling the second receiver to the primary antenna.

35. An apparatus comprising:
a first receiver for Universal Mobile Telecommunications System (UMTS);
a second receiver for Global System for Mobile Communications (GSM) and UMTS, wherein the second receiver comprises a lowpass filter having a bandwidth that is adjustable for GSM and UMTS;
at least one detector configured to determine operation conditions for the apparatus, the detector being a jammer detector being configured to detect the presence of jammers; and
a controller configured to control operation of the first and second receivers based on the determined operation conditions.

* * * * *